United States Patent
Kendall et al.

(10) Patent No.: US 11,606,933 B2
(45) Date of Patent: Mar. 21, 2023

(54) WILD BIRD TREATMENT SYSTEM AND METHODS

(71) Applicants: Ronald J. Kendall, Ransom Canyon, TX (US); Ronald J. Kendall, Jr., Ransom Canyon, TX (US)

(72) Inventors: Ronald J. Kendall, Ransom Canyon, TX (US); Ronald J. Kendall, Jr., Ransom Canyon, TX (US)

(*) Notice: Subject to any disclaimer, the term of this patent is extended or adjusted under 35 U.S.C. 154(b) by 484 days.

(21) Appl. No.: 16/845,063

(22) Filed: Apr. 9, 2020

(65) Prior Publication Data
US 2020/0236909 A1 Jul. 30, 2020

Related U.S. Application Data

(63) Continuation-in-part of application No. 14/543,656, filed on Nov. 17, 2014, now Pat. No. 10,674,714.

(60) Provisional application No. 61/969,383, filed on Mar. 24, 2014.

(51) Int. Cl.
*A01K 31/06* (2006.01)
*A01K 31/02* (2006.01)
*A01M 31/00* (2006.01)
*A01K 39/01* (2006.01)
*A01K 13/00* (2006.01)
*A01K 31/10* (2006.01)

(52) U.S. Cl.
CPC ............ *A01K 31/06* (2013.01); *A01K 13/003* (2013.01); *A01K 31/02* (2013.01); *A01K 31/10* (2013.01); *A01K 39/01* (2013.01); *A01M 31/004* (2013.01)

(58) Field of Classification Search
CPC ...... A01K 31/06; A01K 13/003; A01K 31/02; A01K 31/01; A01K 31/10; A01M 31/004
See application file for complete search history.

(56) References Cited

U.S. PATENT DOCUMENTS 3,744,455 A * 7/1973 Fowler ............... A01K 31/06
119/474
3,847,120 A * 11/1974 Hicks ................. A01K 15/02
119/713
5,483,924 A * 1/1996 Whitaker ............ A01K 15/02
119/713

(Continued)

FOREIGN PATENT DOCUMENTS

KR 20180044534 A * 1/2016 ............. A01K 39/01

*Primary Examiner* — Ebony E Evans
(74) *Attorney, Agent, or Firm* — Matheson Keys & Kordzik PLLC; Jerry M. Keys; Susan M. Maze

(57) ABSTRACT

A wild bird treatment system includes an enclosure for accommodating a plurality of wild coveying birds targeted for treatment with at least one ground level entrance of a size and location to permit the targeted birds to freely enter and exit the enclosure while excluding non-targeted animals. An electronic bird caller for attracting wild coveying birds is provided. A feeder assembly, slidably removable from the enclosure, includes a slider assembly and a feed hopper. The slider assembly, slidably removable from the feeder assembly, includes a feed plate assembly and a feed slide for controlling flow of medicated feed. The feed plate assembly, slidably removable from the slider assembly, includes a feed plate of a size and a food delivery box with outlets of a size to control the rate of medicated feed released from the feed hopper specific to the birds targeted for treatment.

11 Claims, 18 Drawing Sheets

(56) References Cited

U.S. PATENT DOCUMENTS

| | | | | |
|---|---|---|---|---|
| 5,568,792 A * | 10/1996 | Lynch | ............ | A01K 15/02 |
| | | | | 119/713 |
| 7,173,534 B1 * | 2/2007 | Markham | ............ | A01M 31/002 |
| | | | | 340/573.2 |
| 9,814,228 B2 * | 11/2017 | Pinkston | ............ | H05K 999/99 |
| 10,045,525 B2 * | 8/2018 | Husseiny | ............ | A01M 29/16 |
| 10,569,150 B1 * | 2/2020 | Botsko | ............ | G10L 25/51 |
| 2016/0198685 A1 * | 7/2016 | Huffhines | ............ | A01K 31/02 |
| | | | | 119/436 |

* cited by examiner

WILD BIRD TREATMENT SYSTEM AND METHODS

CROSS-REFERENCE TO RELATED APPLICATIONS

The present application is a continuation in part of U.S. patent application Ser. No. 14/543,656, entitled "Wild Bird Treatment System and Methods," filed Nov. 17, 2014, which is herein incorporated by reference as if fully set forth in its entirety for its pertinent and supportive teachings.

This application claims priority pursuant to 35 U.S.C. 119 to U.S. provisional application Ser. No. 61/969,383 entitled "Wild Bird Treatment System," filed on Mar. 24, 2014.

FIELD OF INVENTION

This application concerns systems and methods for providing treatment to wild birds with diseases, and in particular providing treatment to birds with parasitic diseases.

BACKGROUND

Historically, *Colinus virginianus* ("bobwhite quail"), a wild coveying bird, have thrived throughout the Rolling Plains ecoregion of West Texas where they are a valuable economic species. Since 2010, bobwhite quail have experienced a historic decline in the Rolling Plains ecoregion. In the past, such declines in the bird population have been attributed to multiple causes, including drought, but the actual cause was not known. Results from recent research suggest that the historic decline may be the result of parasites in the bobwhite quail population.

Systems and methods are herein disclosed for treating wild populations of a targeted bird species in their natural habitat for parasites and disease. In particular, the systems and methods herein disclosed are for treating wild populations of wild coveying birds for their protection and population enhancement.

As used herein the term "covey" refers to a social group of birds of the same species.

As used herein the term "coveying" refers to the collective bird behavior associated with a social group of birds of the same species.

As used herein the term "wild bird" refers to any bird of a species that is living in nature without significant human control or care.

SUMMARY

Briefly, novel systems and methods for treating wild birds are provided.

In one aspect, the treatment system includes an enclosure formed of a mesh material large enough to accommodate a plurality of wild coveying birds targeted for treatment. A call bird box is positioned within the enclosure for housing a call bird of the same species as the targeted wild coveying birds. The call bird makes calls for attracting the plurality of targeted wild coveying birds. At least one ground level entrance into the enclosure is provided, sized and located to permit the entry of targeted wild coveying birds into the enclosure while excluding non-targeted animals. The system includes a feeder within the enclosure for containing medicated feed for feeding the targeted wild coveying birds entering the enclosure in order to treat the targeted wild coveying birds for parasites or disease. A cover for protecting the medicated feed in the feeder from the environment is provided.

In another embodiment, the system includes an enclosure formed at least partially of a mesh material large enough to accommodate a plurality of wild coveying birds targeted for treatment. An electronic bird caller configured to emit the natural covey call of and attract the wild coveying birds targeted for treatment call bird box is mounted on or positioned adjacent to the enclosure. At least one ground level entrance into the enclosure is provided, sized and located to permit the entry of targeted wild coveying birds into the enclosure while excluding non-targeted animals. The system includes a removable feeder assembly for positioning within the enclosure for containing medicated feed for feeding the targeted wild coveying birds entering the enclosure in order to treat the targeted wild coveying birds for parasites or disease. The feeder assembly is slidably removable from the enclosure for resupplying the feeder assembly with medicated feed and providing maintenance.

In another aspect, a method for installing a system for treating wild coveying birds targeted for treatment includes installing an enclosure having entrances for the wild coveying birds targeted for treatment on the native ground at a site in the habitat area of the targeted wild birds. For the first embodiment of the system, the method further includes mounting a call bird box in the enclosure and introducing a call bird of the same species as the targeted wild birds and its feed and water into the call bird box. A feeder is installed within the enclosure, and the method includes charging the feeder with feed suitable for the targeted wild birds which enter the enclosure.

In another aspect, a method for installing a system for treating wild coveying birds targeted for treatment includes installing an enclosure having entrances for the wild coveying birds targeted for treatment on the native ground at a site in the habitat area of the targeted wild birds. For the second embodiment of the system, the method further includes mounting the electronic bird caller on or positioning the electronic bird caller adjacent to the enclosure wherein the electronic bird caller is configured to emit the natural covey call of and attract the wild coveying birds targeted for treatment. A removable feeder assembly having a feed hopper is charged with the medicated feed suitable for the targeted wild birds and then slidably positioned into the enclosure.

In a further aspect, a method for treating wild birds includes collecting at least one sample from at least one targeted wild bird from a targeted area of a natural habitat having a plurality of targeted wild birds. The method further includes testing the at least one collected sample to determine if the targeted birds are infected with parasites or another disease. The number of and location of treatment systems to be installed at sites in the targeted area that are needed to treat the plurality of targeted wild birds in the targeted area is determined. The method includes installing a plurality of treatment systems at a plurality of sites based upon the determining.

In one aspect, each of the treatment systems comprise an enclosure with at least one entrance for targeted wild birds to enter the enclosure, a call bird box positioned within the enclosure for housing a call bird of the same species as the targeted wild birds that makes calls for attracting the plurality of targeted wild birds to enter the enclosure through the at least one entrance, and a feeder located within the enclosure for storing feed suitable for the targeted birds, and charging the feeder with medicated feed to treat the targeted wild birds entering the enclosure for parasites or disease.

In another aspect, each of the treatment systems comprise an enclosure with at least one entrance for targeted wild birds to enter the enclosure, an electronic bird caller mounted on or positioned adjacent to the enclosure that emits the natural covey call for attracting the plurality of targeted wild birds to enter the enclosure through the at least one entrance, a removably feeder assembly with a feed hopper movable in and out of the enclosure for storing and providing medicated feed suitable for the targeted birds, and charging the feed hopper with medicated feed to treat the targeted wild birds entering the enclosure for parasites or disease.

BRIEF DESCRIPTION OF THE DRAWINGS

For a more complete understanding of one or more embodiments of the present invention and the advantages thereof, reference is now made to the following descriptions taken in conjunction with the accompanying drawings, in which.

DETAILED DESCRIPTION

The methods and systems disclosed herein provide a means of strategic delivery of treatments for disease or parasites to any targeted wild, coveying bird species in their natural habitat. Examples of wild, coveying bird species for which the methods and systems may be used include bobwhite quail, scaled quail, California quail, Gambel's quail, and certain species of pheasants. In a particular embodiment, a system and methods for effectively treating wild, coveying bird species for parasitic worms using treated feed is herein disclosed.

Bobwhite quail of the Rolling Plains ecoregion of West Texas are infected with parasitic worms, including the eyeworm (*Oxyspirura petrowi*), as well as other parasitic nematodes (such as cecal worms). Other types of wild, coveying birds may also be infected with the same or other parasitic nematodes. Recent scientific evidence reveals that, as strong infections occur, impacts to survival and reproduction are probable outcomes. A medicated feed can reduce or eliminate parasitic nematode infections. The methods and systems disclosed herein deliver medicated feed directly to the targeted wild, coveying bird populations, such as the bobwhite quail, while excluding other wildlife and domesticated animals from the medicated feed.

The uncontrolled distribution of medicated feed for treating a targeted bird species in a habitat may result in such feed also being ingested by non-targeted wild and domesticated animals. This may be harmful or destructive to the non-targeted species. In addition, the treatment of diseases or parasites in wildlife with medicated feed may be subject to regulation by state and federal agencies to limit the potential harm to non-targeted species. As a result, the unrestricted distribution of medicated feed into a habitat may be legally prohibited pending the conduct of trial studies of the impact of the medicated feed on the habitat.

Figure 1:
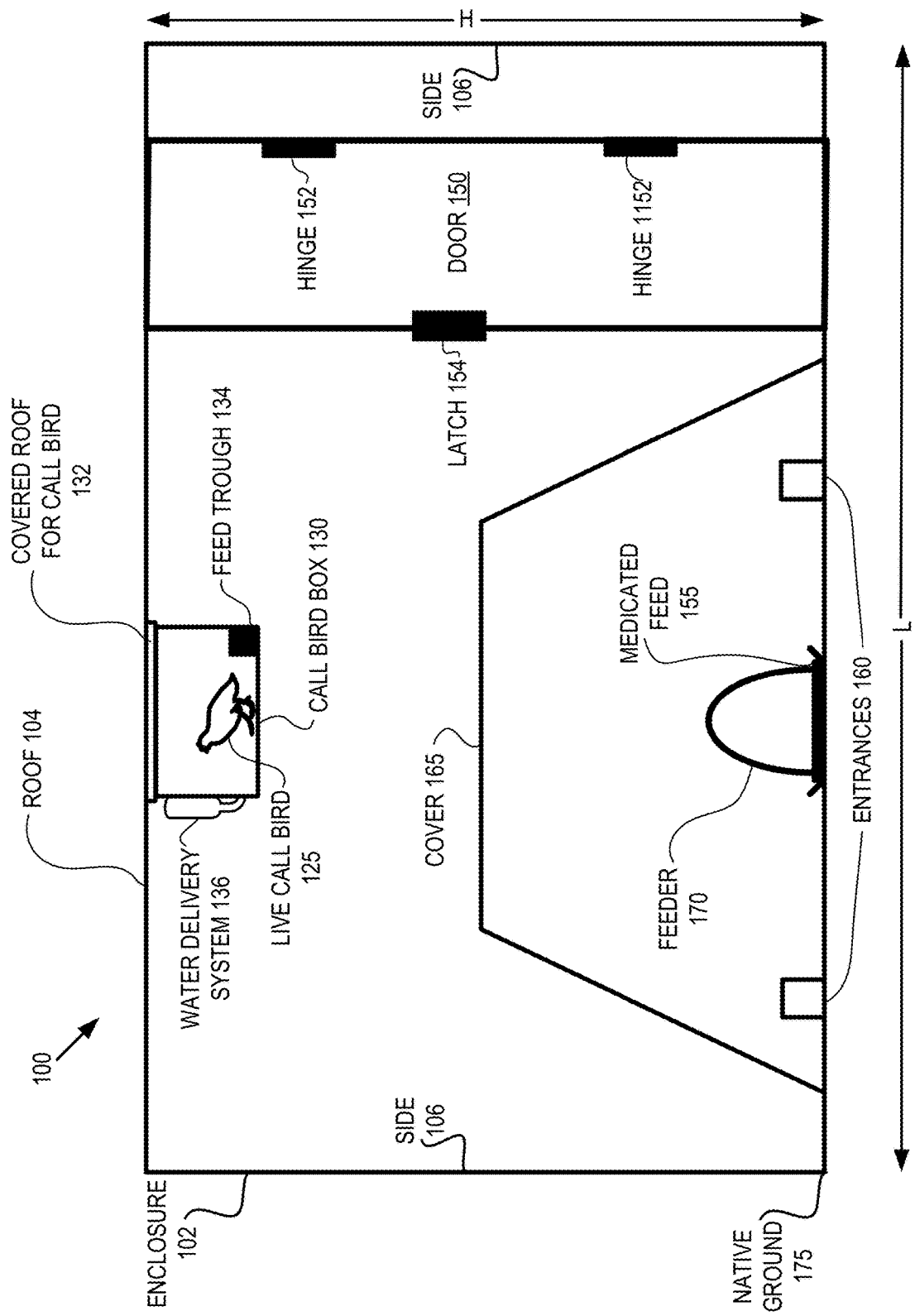
FIG. 1 illustrates a front elevation view of an embodiment of an exemplary system for wild bird treatment.
Figure 2:
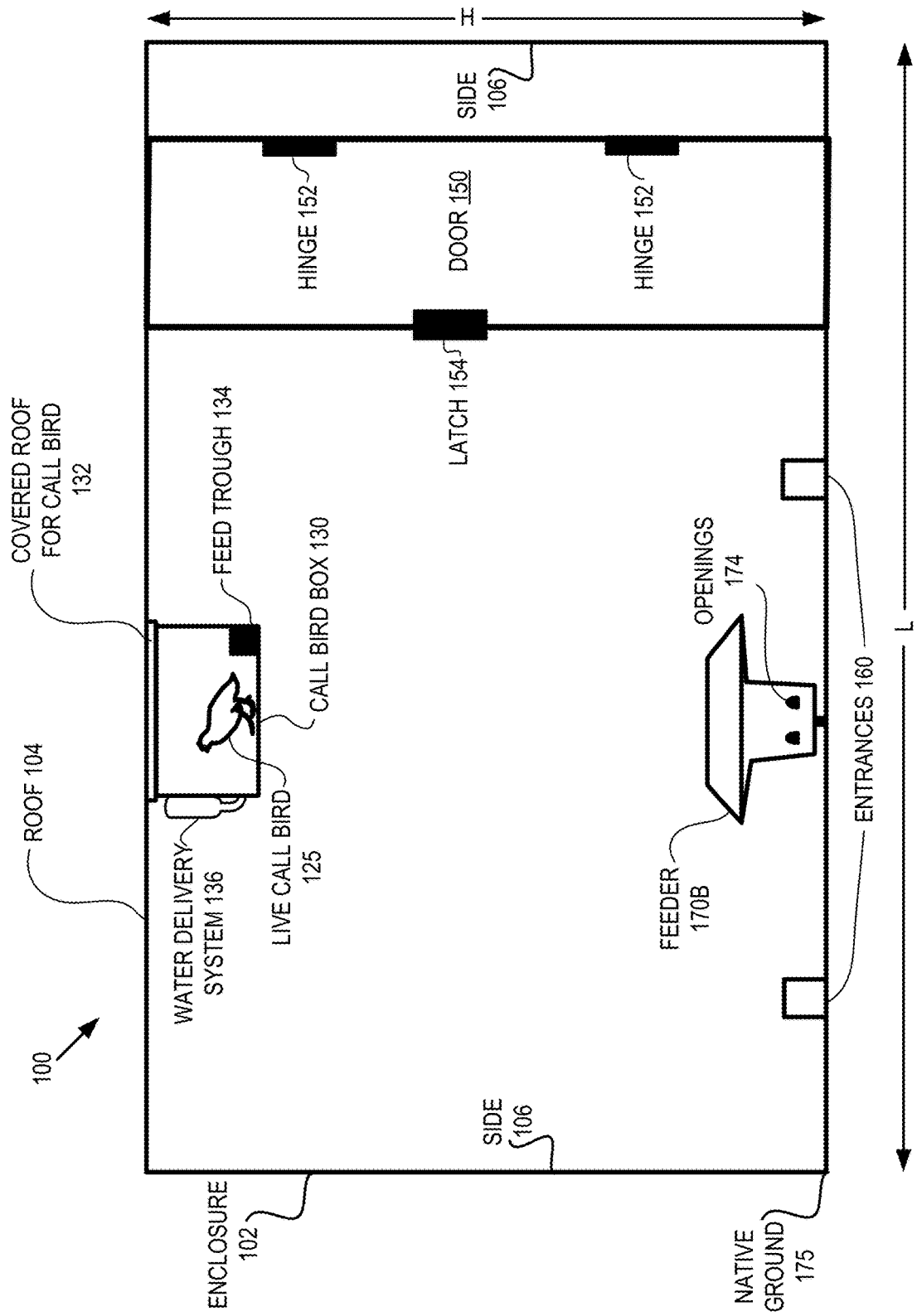
FIG. 2 illustrates a front elevation view of an alternate embodiment of an exemplary system for wild bird treatment.
Figure 3:
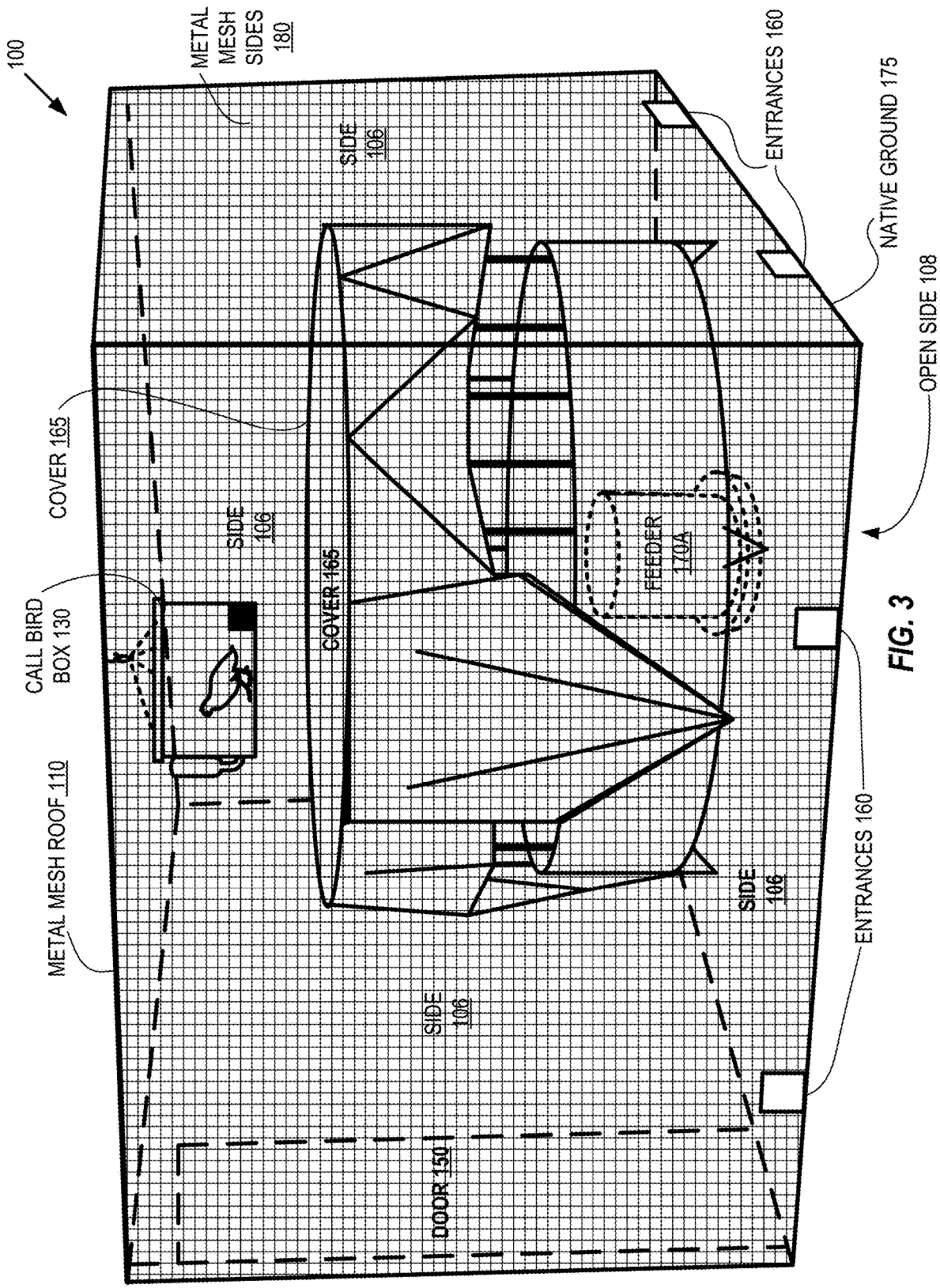
FIG. 3 illustrates an isometric view of an embodiment of an exemplary system for wild bird treatment.

With reference to FIGS. 1, 2, and 3, an exemplary wild bird treatment system 100 is herein described that permits medicated feed to be freely available to a targeted wild species but concurrently inaccessible to non-targeted wild and domesticated animals in the surrounding environment. FIGS. 1 and 2 illustrate a front elevation view and FIG. 3 illustrates an isometric view of an exemplary system 100 for treating wild birds for disease through the use of a medicated feed. System 100 may be used for many years while continuing to treat wild birds, particularly wild coveying birds, such as bobwhite quail for example, for parasitic nematode infections or other diseases.

In an embodiment, wild bird treatment system 100 having an enclosure 102 may be placed on native ground 175 of the wild bird habitat for delivering a medicated feed 155 to wild, coveying birds. Enclosure 102 of system 100 may be anchored to native ground 175 at the installation site without holes under the base of enclosure 102. Enclosure 102 is large enough that a covey or multiple coveys of wild birds may enter enclosure 102 with adequate available space. In an embodiment for treating bobwhite quail, enclosure 102 of system 100 is large enough to accommodate 25-50 birds.

Referring now to FIG. 3, for wild, coveying birds such as bobwhite quail for example, enclosure 102 may be a generally rectangular structure having a roof 104 and sides 106, which form an open side 108 of enclosure 102 for installing on native ground 175 of the wild bird habitat. For bobwhite quail, enclosure 102 may have, for example, a height of approximately six feet, a width of approximately ten feet, and length of approximately ten feet. It should be noted, however, that other forms, dimensions, and geometries of enclosures may be used, including a hemispherical shaped enclosure. The color of enclosure 102 is such that it blends into the landscape as part of the native habitat. For example, a flat green color is suitable in the Rolling Plains ecoregion of West Texas.

Figure 4:
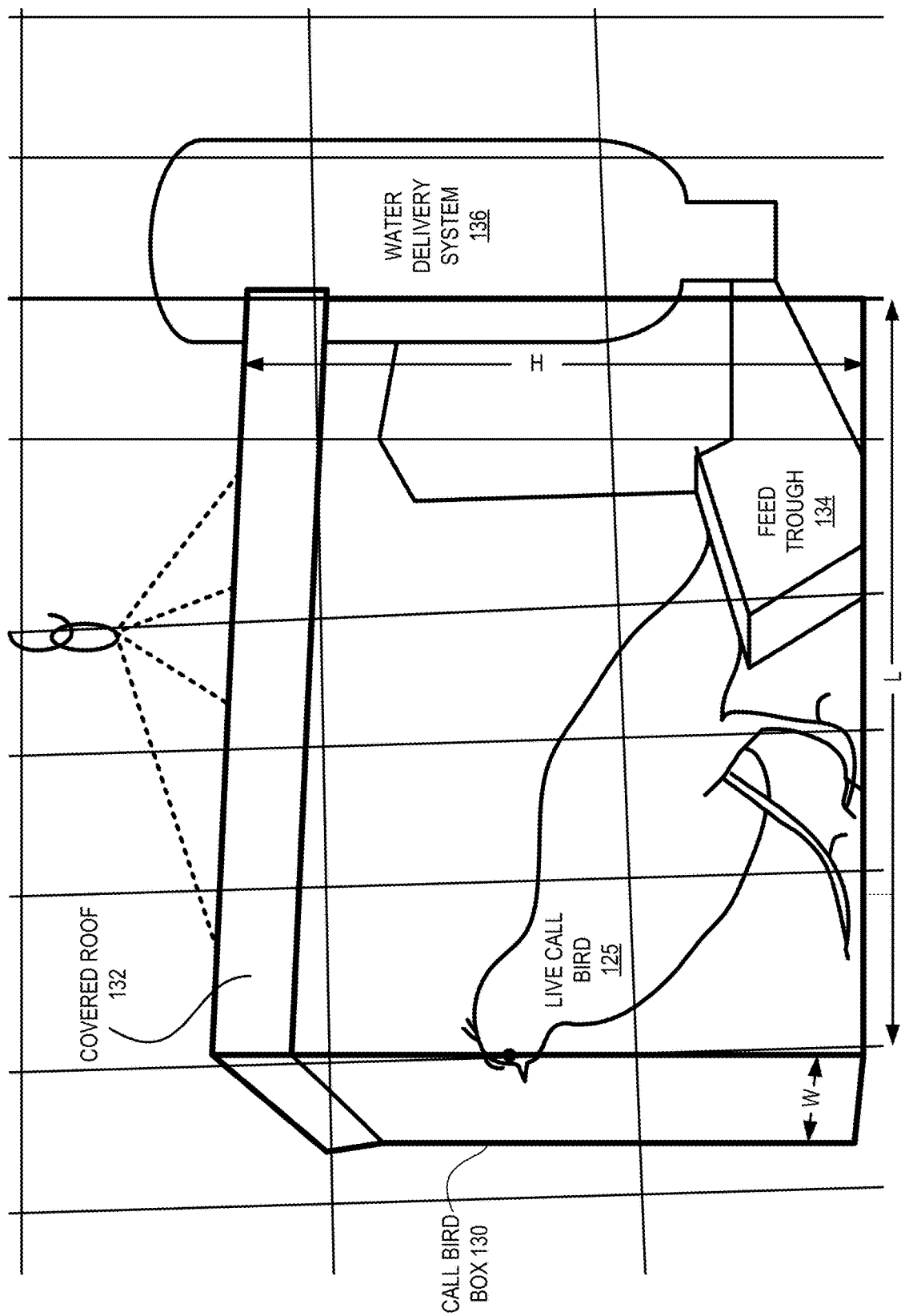
FIG. 4 illustrates an isometric detail view of a call bird box hanging within the enclosure of an exemplary system, according to embodiments of the present invention.

Referring to FIGS. 3 and 4, a conventional metal mesh 110 with openings 112 formed therein may cover roof 104 of enclosure 102 of system 100, and a metal mesh 180 with openings 112 formed therein covers sides 106 of enclosure 102. While any suitable material may be used to form enclosure 102, fabricated metal mesh made of 14 gauge expanded metal is suitable to prevent or at least inhibit wild animals from climbing up and onto enclosure 102. Openings 112 in the metal mesh may be sized to prevent non-targeted wild and domesticated animals from entering system 100 to eat or disturb medicated feed 155. In an embodiment for delivery of drug treatment to wild coveying birds such as bobwhite quail, a commercially available metal mesh 180 for sides 106 may have rectangular openings with approximate 3 inch by 1½ inch sides, and a commercially available metal mesh 110 for roof 104 may have rectangular openings with approximate 3 inch by 1½ inch sides. In another embodiment, a commercially available metal mesh 180 for sides 106 may have openings formed by a diamond-shaped quadrilateral, such as a parallelogram or rhombus, with axial dimensions of approximately 2½ inches by 1½ inches. In an alternate embodiment, commercially available corrugated metal panels may be used for roof 104. One or more bird entrances 160 are formed in metal mesh 180 of sides 106 at approximately ground level to permit a targeted wild bird species to walk in, feed, and then walk out. In an embodiment for treating wild, coveying birds such as bobwhite quail, four entrances 160 (two shown in FIGS. 1, 2, and 3) may be provided in enclosure 102 of system 100, preferably two on a side and two on the opposing side.

System 100 includes a call bird box 130 having a covered roof 132 and a feeder 170 protected from the environment by a cover 165 (if required), all of which are described in more detail below.

FIG. 4 depicts an isometric detail view of an embodiment of a call bird box 130 within enclosure 102 formed by metal mesh 110 and 180. Call bird box 130 is designed and constructed to be a home for a call bird 125 of the same species as the targeted birds to be treated with system 100. Call bird box 130 may be a sub-cage providing live call bird 125 with protection, including covered roof 132. Call bird box 130 includes feed trough 134 and a water bottle delivery system with a drinking cap for call bird water access ("water delivery system") 136, in order to provide a continual supply of food and water to live call bird 125. For a bobwhite quail call bird, call bird box 130 may be approximately ten inches wide by ten inches long by eight inches high. In an embodiment for treating wild coveying birds such as bobwhite quail, the bottom of call bird box 130 may be located approximately five feet from native ground 175 to help the bird calls to carry a greater distance, and call bird box 130 is preferably positioned on the east side of system 100 in order to be shaded from the summer afternoon sun.

Referring to FIGS. 1 and 2, system 100 may also include a door 150 with hinges 152 and latch 154 to provide human access to system 100 for replenishing water to water delivery system 136, food to feed trough 134, and medicated feed 155 to feeder 170.

Once system 100 is installed at a site in the wild bird habitat as described in more detail below, bird calls of live call bird 125 attract targeted, wild coveying birds to system 100. Once the targeted birds are attracted to the vicinity of system 100, they are enticed inside enclosure 102 of system 100 by the sight of, and bird calls from, live call bird 125. In an embodiment for treating bobwhite quail, live call bird 125 may be an easily obtainable pen-reared bobwhite quail.

Once inside enclosure 102 of system 100, the targeted species readily feeds on medicated feed 155 provided in feeder 170. Feeder 170 provides continual medicated feed 155 to the targeted wild birds. Feeder 170 may be a conventional, commercially available feeder, such as those commonly used for feeding wild game birds. In an embodiment, wild birds habituated to feeding in system 100 can readily be provided medicated feed 155 for parasite or disease control at any time. A prior evaluation of infection levels in the targeted species, for example wild coveying birds such as bobwhite quail, determines when and where to provide medicated feed 155 in systems 100 as will be more fully described hereinafter.

Medicated feed 155 is preferably protected from the environment. The Rolling Plains ecoregion, in particular, is subject to high winds. To treat only a targeted species and protect non-targeted species, medicated feed 155 must be contained and protected from being blown outside treatment system 100. In addition, the efficacy of medicated feed 155 may be dependent on environmental conditions, such that it must be protected from various forms of precipitation, for example.

Figure 6:
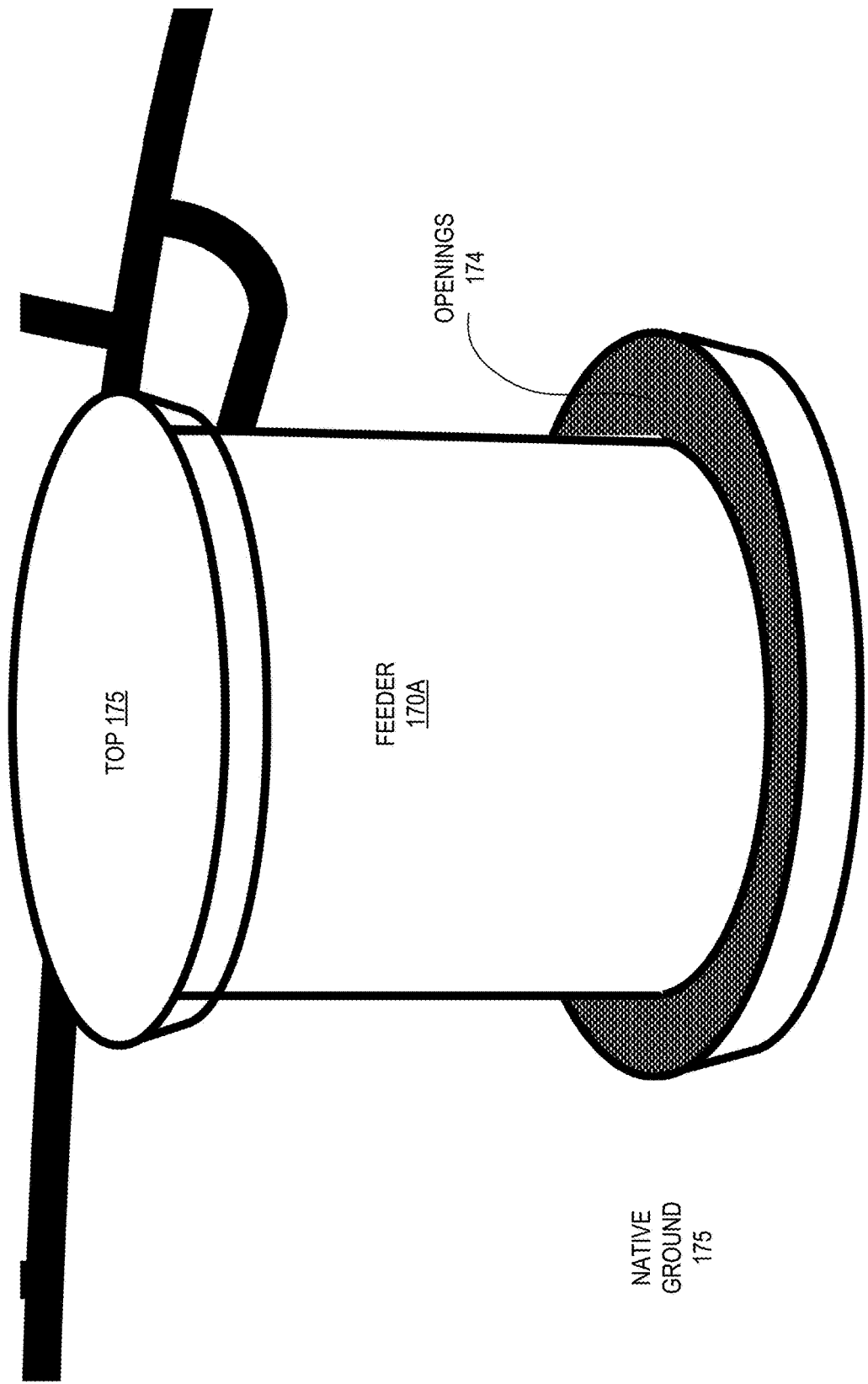
FIG. 6 illustrates a detail view of a wild bird treatment system feeder, according to embodiments of the present invention.
Figure 7:
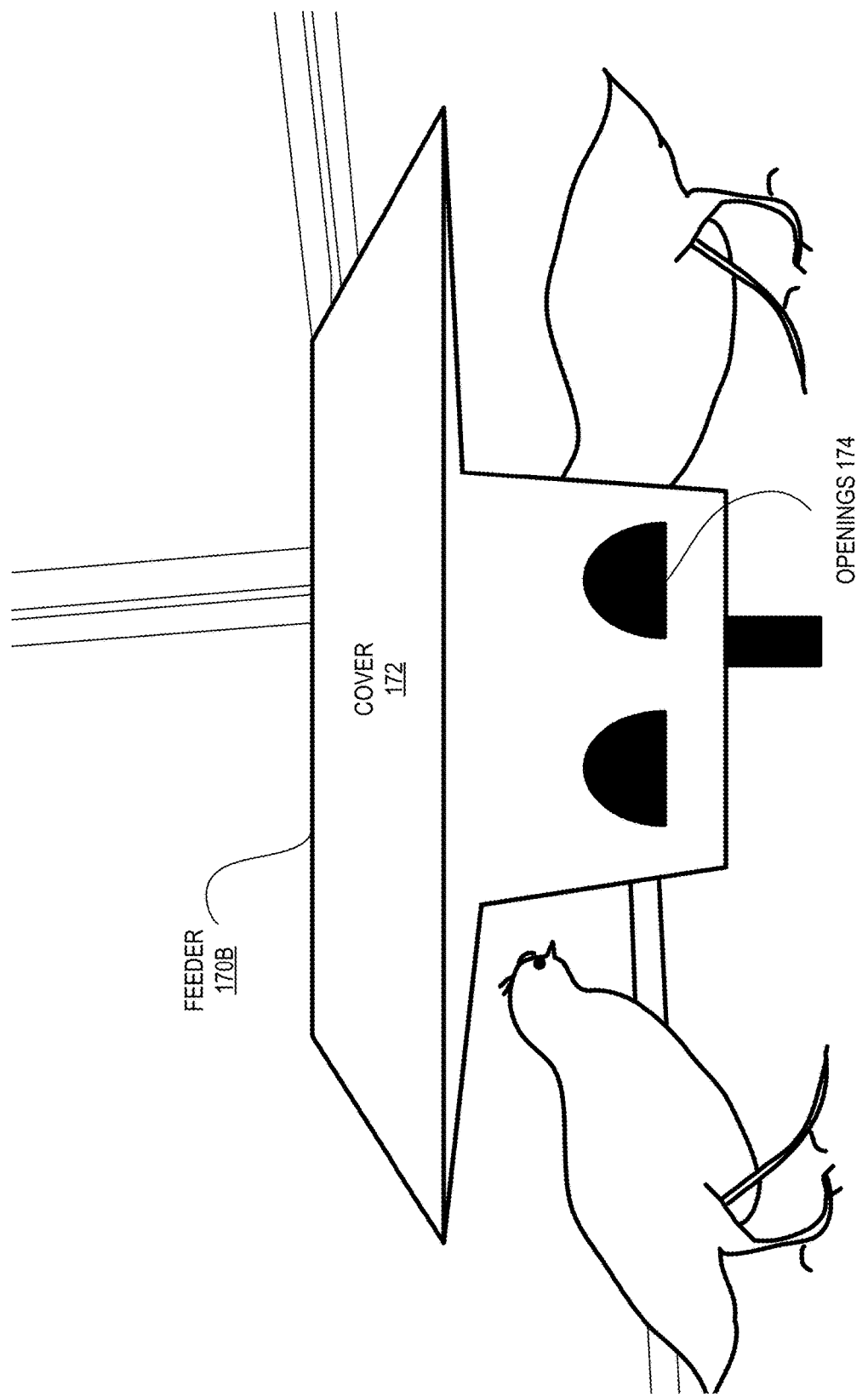
FIG. 7 illustrates a detail view of an alternate wild bird treatment system feeder, according to embodiments of the present invention.

FIGS. 6 and 7 depict detailed views of suitable protected feeders 170A and 170B, respectively, for wild bird treatment system 100. Referring now to FIGS. 3 and 6, feeder 170A is depicted protected by a suitable cover 165 which may be a tarp, for example, such that the medicated feed is not blown outside system 100 by wind or damaged by precipitation, such as rainfall or snow. The feeder includes a container 170A with a removable top 175 for holding the feed. FIGS. 2 and 7 depict a suitable feeder 170B with an integral cover 172 to protect medicated feed 155 from weather and wind. Feeders 170A and 170B have openings 174 formed therein so that the targeted birds can access medicated feed 155. Openings 174 in feeder 170B are sized to permit a quail's head to access the opening yet small enough to prevent the wind from blowing medicated feed 155 outside the feeder. Openings 174 are also preferably elevated above native ground 175 to prevent small animals that may enter enclosure 102 through entrances 160 of enclosure 102 to access medicated feed 155.

Figure 5:
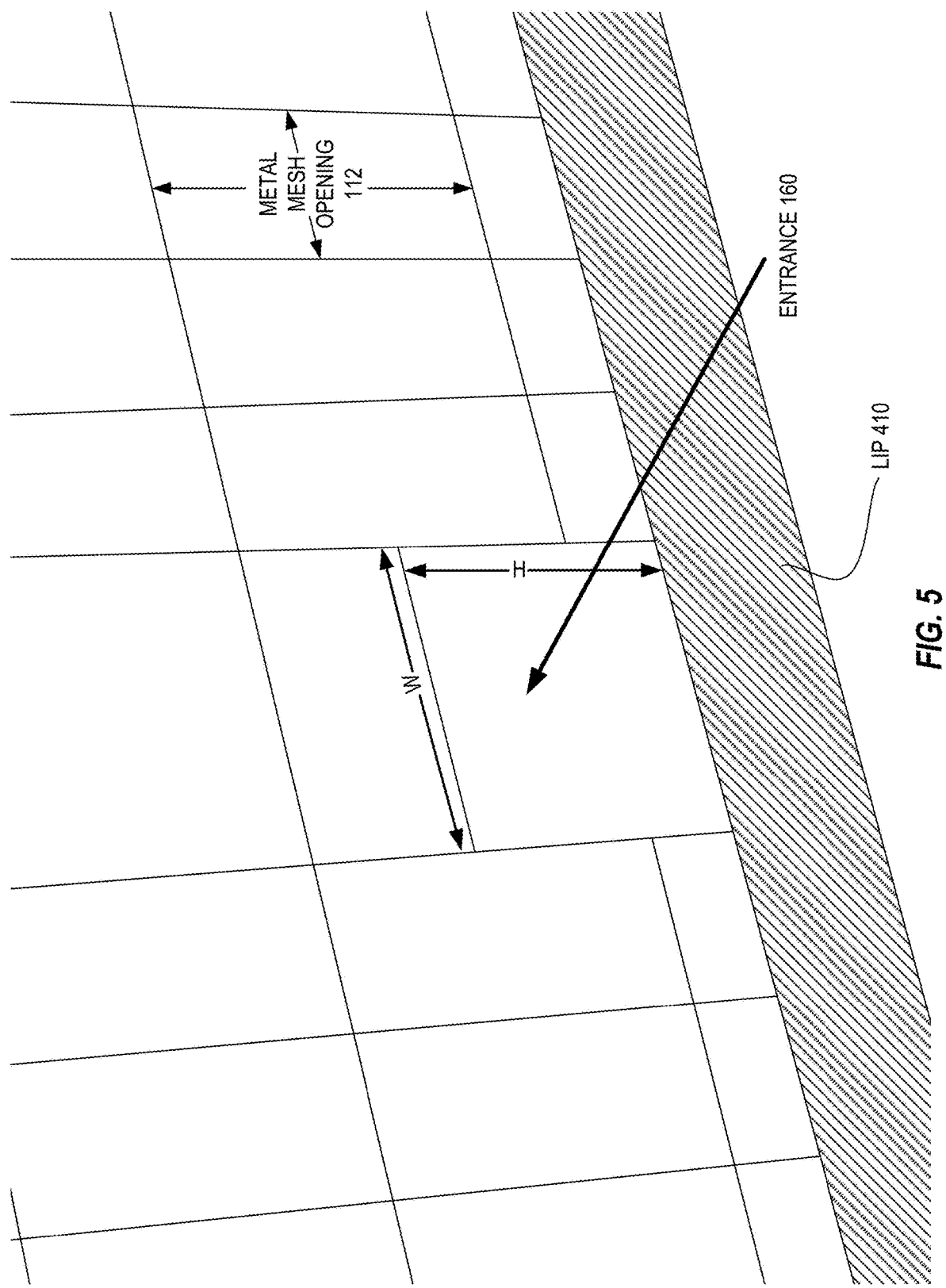
FIG. 5 illustrates a detail view of a bird entrance to an enclosure of an exemplary system for treating wild birds, according to embodiments of the present invention.

Referring now to FIG. 5, details of exemplary entrances 160 of enclosure 102 of system 100 are further illustrated. Metal mesh 180 covers sides of enclosure 102 to system 100 to exclude non-targeted wild and domesticated animals. Ground entrances 160 may be sized to allow the targeted species to walk into enclosure 102 to feed, while excluding other birds and particularly mammalian wildlife, thus administering medicated feed 155 for parasite or disease control to only the targeted species. In an embodiment for treatment of wild coveying birds, such as bobwhite quail, two square entrances 160 are provided in each of two sides of enclosure 102 and for bobwhite quail are sized to be approximately four inches high by four inches wide. In another embodiment for treatment of wild coveying birds such as bobwhite quail, two triangular entrances 160 are provided in each of two sides of enclosure 102 and for bobwhite quail are sized to have a base of approximately four inches and sides of approximately five inches. A protective lip 410 made of metal or other suitable materials may be deployed around enclosure 102 to deter ground predators from digging under enclosure 102 and disturbing medicated feed 155.

Figure 11:
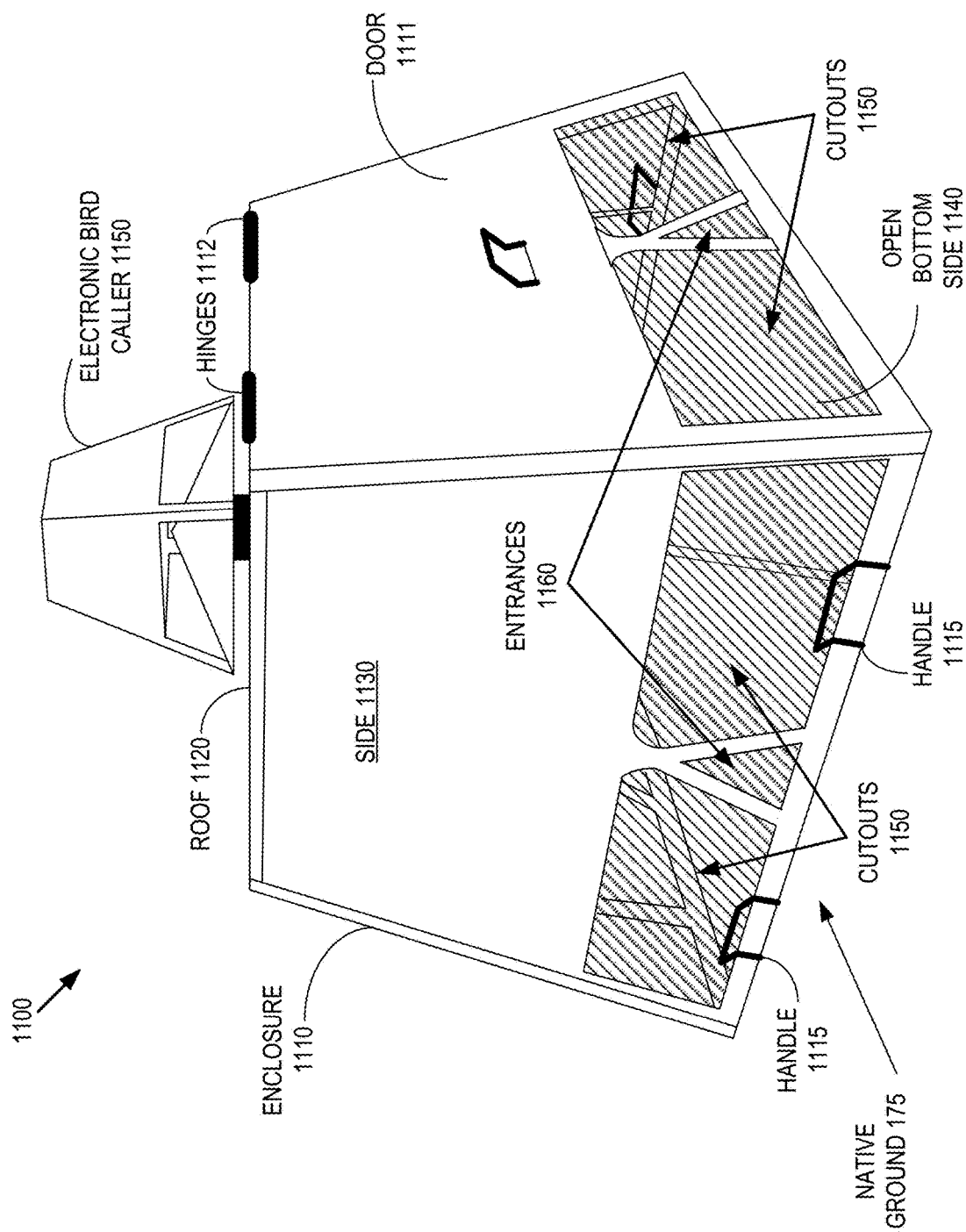
FIG. 11 illustrates an isometric view of an alternative embodiment of a wild bird treatment system.
Figure 12:
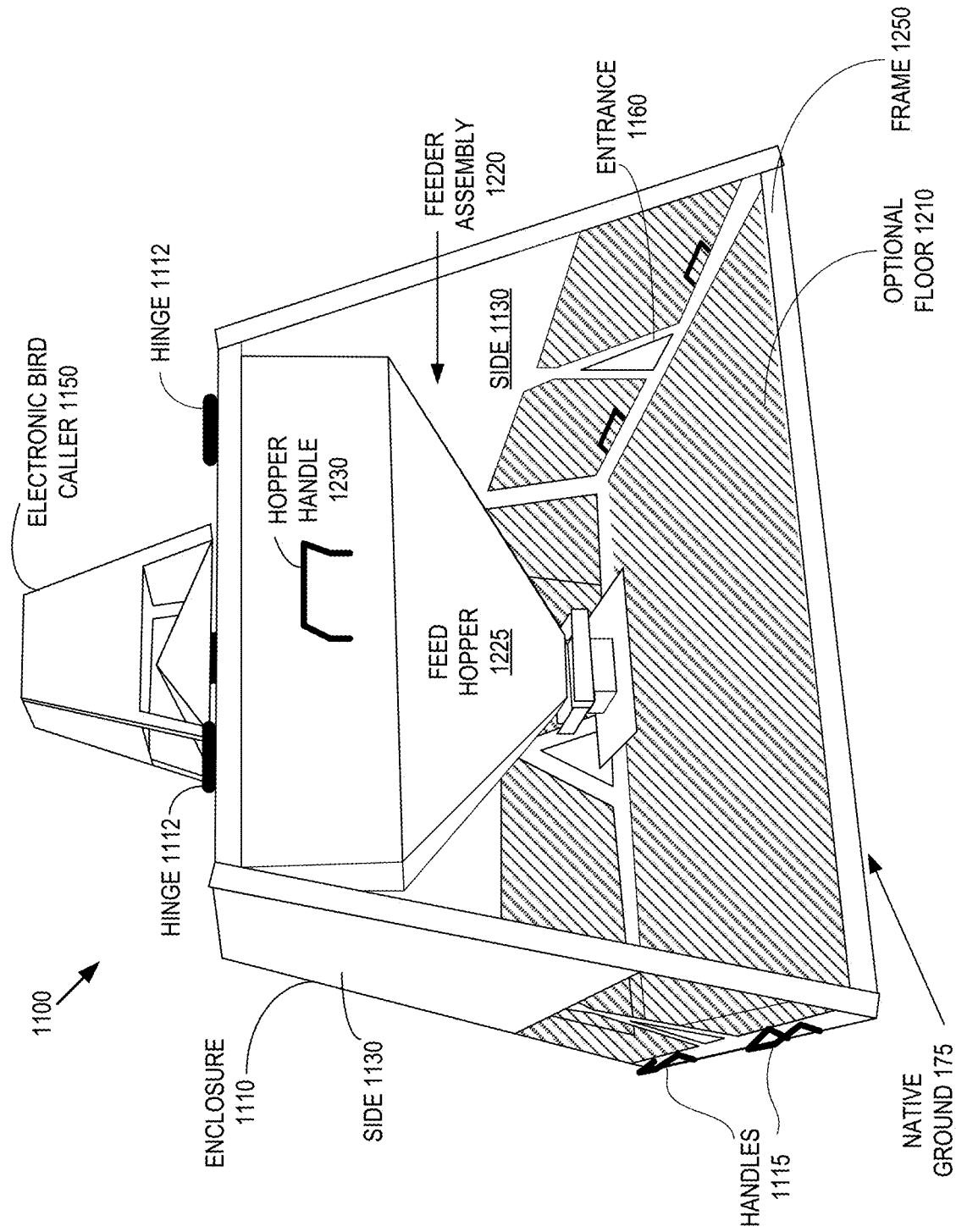
FIG. 12 illustrates an isometric view of the interior of an alternative embodiment of a wild bird treatment system.

Referring now to FIGS. 11 and 12, an alternative embodiment of a wild bird treatment system is depicted as system 1100. System 1100 is a more portable treatment system that provides for greater medicated feed storage and delivery to the targeted birds and reduces the need to recharge the treatment system 1100 with medicated feed for a longer period. System 1100 permits medicated feed 155, such as described in U.S. Pat. No. 10,583,124, to be freely available to a targeted wild species but concurrently inaccessible to non-targeted wild and domesticated animals in the surrounding environment.

System 1100, having an enclosure 1110, may be placed on native ground 175 of a wild bird habitat for delivery of medicated feed 155 to wild, coveying birds. Enclosure 1110 of system 1100 is large enough that a covey or multiple coveys of wild birds may enter enclosure 1110 with adequate available space. In an embodiment for treating wild bobwhite quail, enclosure 1110 of system 1100 is large enough to accommodate 30 or more wild bobwhite quail, for example, representing 1-2 coveys.

Enclosure 1110 may be a generally square structure having a roof 1120, sides 1130, and an open bottom side 1140. System 1100 includes at least two angle iron rails located on the interior of and near the top of two opposing sides 1130, door 1111 with hinges 1112 to provide access to enclosure 1110 for replenishing medicated feed 155, for example. Other examples for accessing enclosure 1110 include general maintenance and installing a camera and/or reconnaissance equipment. In an embodiment for treating wild bobwhite quail, enclosure 1110 may have, for example, isosceles trapezoid shaped sides 1130 and door 1111 with a height of approximately 27 inches, a top width of approximately 27 inches, and a bottom width of approximately 40 inches, a 27×27 square inch roof 1120, and a 40×40 square inch open bottom side 1140. It should be noted that other forms, dimensions, and geometries of enclosures may be used. With overall dimensions of 40 inches wide, 40 inches deep, and 27 inches high, system 1100 may be easily tucked into brush reducing the view of aerial predators, such as hawks. The wide bottom and low center of gravity make the system very difficult for large animals, such as raccoons, feral hogs, or cows to push over or dig under. Although enclosure 1110 is predator proof, a protective lip 410 (FIG. 5), made of metal or other suitable materials, may be deployed around enclosure 1110 to deter ground predators from digging under enclosure 1110.

Sides 1130 include wire mesh cutouts 1150, allowing wild bobwhite quail, for example, to scan 360 degrees for predators after entering enclosure 1110. In an embodiment for treating wild bobwhite quail, the top of cutouts 1150 is about 8 inches above open bottom 1140, which is the height of a typical bobwhite quail. The cutouts allow wind to blow through, making system 1100 undesirable to nesting small mammals, such as rats, for example, or snakes seeking a hiding place. Non-mesh portions of sides 1130 are solid metal and are low enough to protect medicated feed 155 from rain, high winds, and UV (sunlight).

System 1100 includes handles 1115 on opposite sides of system 1100 to allow for easy movement or relocation of system 1100. Enclosure 1110 of system 1100 may be anchored to native ground 175 at the installation site by, for example, T-anchors or stakes through handles 1115. The color of enclosure 1110 is such that it blends into the landscape as part of the native habitat. For example, a flat green color is suitable in the Rolling Plains ecoregion of West Texas.

While any suitable material may be used to form enclosure 1110, A36 14-gauge sheet steel is a suitable material for forming sides 1130 and roof 1120. Any suitable mesh material may be used to form cutouts 1150. In an embodiment for delivery of drug treatment to wild bobwhite quail, ¾ inch #9 steel expanded metal, having diamond-shaped openings with dimensions of approximately 0.563 inches by 1.688 inches is suitable for forming cutouts 1150. Sides 1130, roof 1120, and the metal mesh of cutouts 1150 are affixed to each other such that there are no gaps, for example, by shielded metal arc welding.

One or more bird entrances 1160 are formed in enclosure 1110 at approximately ground level and open bottom 1140 to permit a targeted wild bird species to walk in, feed, and then walk out, while excluding other birds and particularly mammalian wildlife. In an embodiment for treating wild bobwhite quail, four entrances 1160 may be provided in enclosure 1110 of system 1100, preferably one on each side, each entrance 1160 triangular with a base of approximately four inches and sides of approximately five inches.

FIG. 12 depicts the interior of system 1100 (door 1111 not shown in this view), in which an optional floor 1210 may be seen. Optional floor 1210 provides additional protection from non-targeted and predatory animals digging into system 1100 for those applications where this could be an issue. In an embodiment for delivery of drug treatment to wild bobwhite quail, optional floor 1210 may be formed of ¾ inch #9 steel expanded metal, having diamond-shaped openings with dimensions of approximately 0.563 inches by 1.688 inches welded to a flexible metal frame. Optional floor 1210 is flexible and may be placed inside enclosure 1110 after installation of enclosure 1110 at a treatment site and fastened to frame 1250 of enclosure 1110 by, for example, self-tapping screws. When installed, the metal mesh of floor 1210 interfaces native ground 175 of a wild bird habitat. An installation of system 1100 with optional floor 1210 may include throwing dirt over optional floor 1210 to make entrances 1160 flush with native ground 175. FIG. 12 also depicts feeder assembly 1220 with feed hopper 1225 and hopper handle 1230 described in more detail below.

Figure 13:
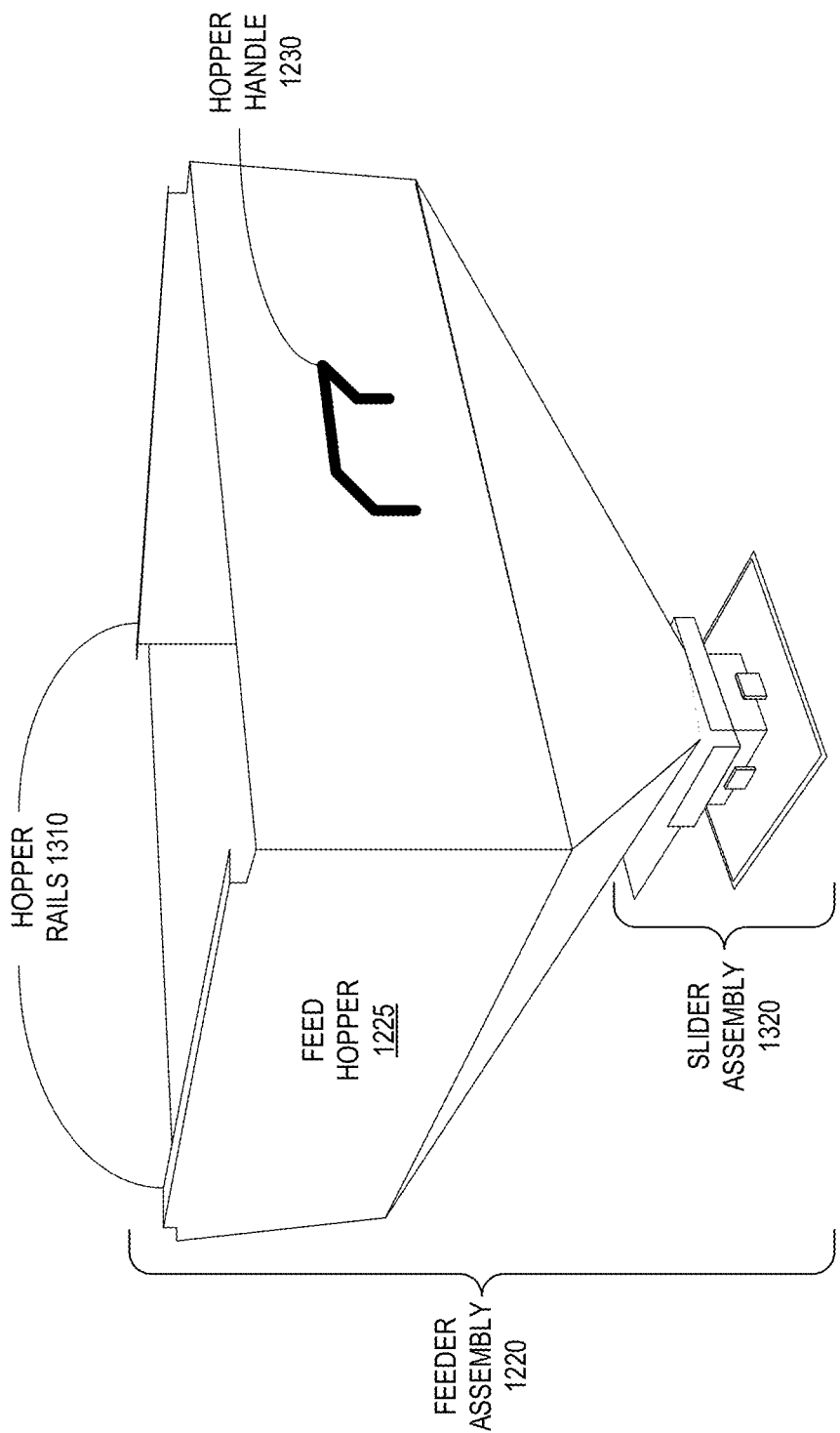
FIG. 13 illustrates a detail view of a wild bird treatment system removable feeder assembly, according to embodiments of the present invention.

FIG. 13 depicts a detailed view of feeder assembly 1220. Feeder assembly 1220 includes feed hopper 1225 with integrated hopper rails 1310 located at the top of two opposing sides of hopper 1225, which allow feeder assembly 1220 to easily slide on angle iron rails installed on the interior of sides 1130 (not shown), allowing opening or removal of feeder assembly 1220 from system 1100 for cleaning, feed refill, or other needs using hopper handle 1230. Two slider rails 1510 are affixed to opposing sides of the bottom of feed hopper 1225 for supporting and guiding feed slide 1410, discussed in more detail below. With feeder assembly 1220 in its extended position (not shown) as discussed below, approximately 50 pounds of medicated feed 155 or 150 pound of unmedicated feed can be introduced into feeder assembly 1220 after system 1100 is located into an appropriate location and treatment zone for a targeted wild bird species. Feeder assembly 1220 can be completely removed from system 1100 for cleaning or general maintenance. The design of feeder assembly 1220 enables easy sliding of feed hopper 1225 even while containing 150 pounds of medicated feed. In an embodiment for treating wild bobwhite quail, feed hopper 1225 may be funnel shaped with a 27 square inch inlet and a 3×3 square inch outlet. Feed hopper 1225, slider rails 1510, and hopper rails 1310 may be formed of A36 14-gauge sheet steel. The angle iron rails may be formed of A36 steel and may include molded plastic to make sliding easier. For treating wild bobwhite quail, 50 pounds of medicated feed 155 loaded into feed hopper 1225 is sufficient for providing approximately 21 days of treatment. System 1100 can also be used for supplemental feeding with unmedicated, fortified feed in, for example, marginal habitat or during periods of drought. System 1100 installed and filled with 150 pounds of unmedicated feed can go unattended for months, even an entire quail season. Feeder assembly 1220 also includes slider assembly 1320, described herein below.

Figure 14:
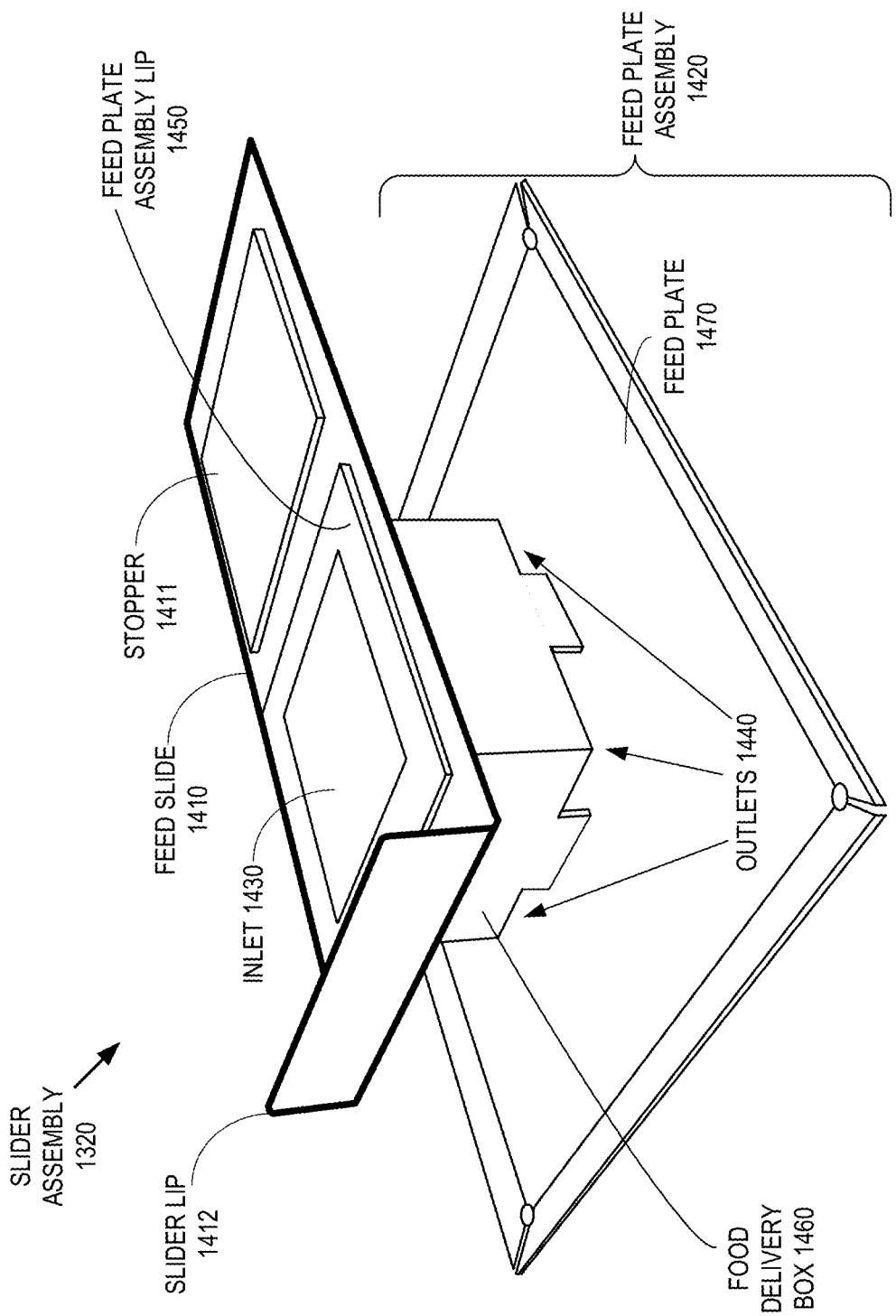
FIG. 14 illustrates a detail view of a wild bird treatment system removable slider assembly in open position, according to embodiments of the present invention.
Figure 15:
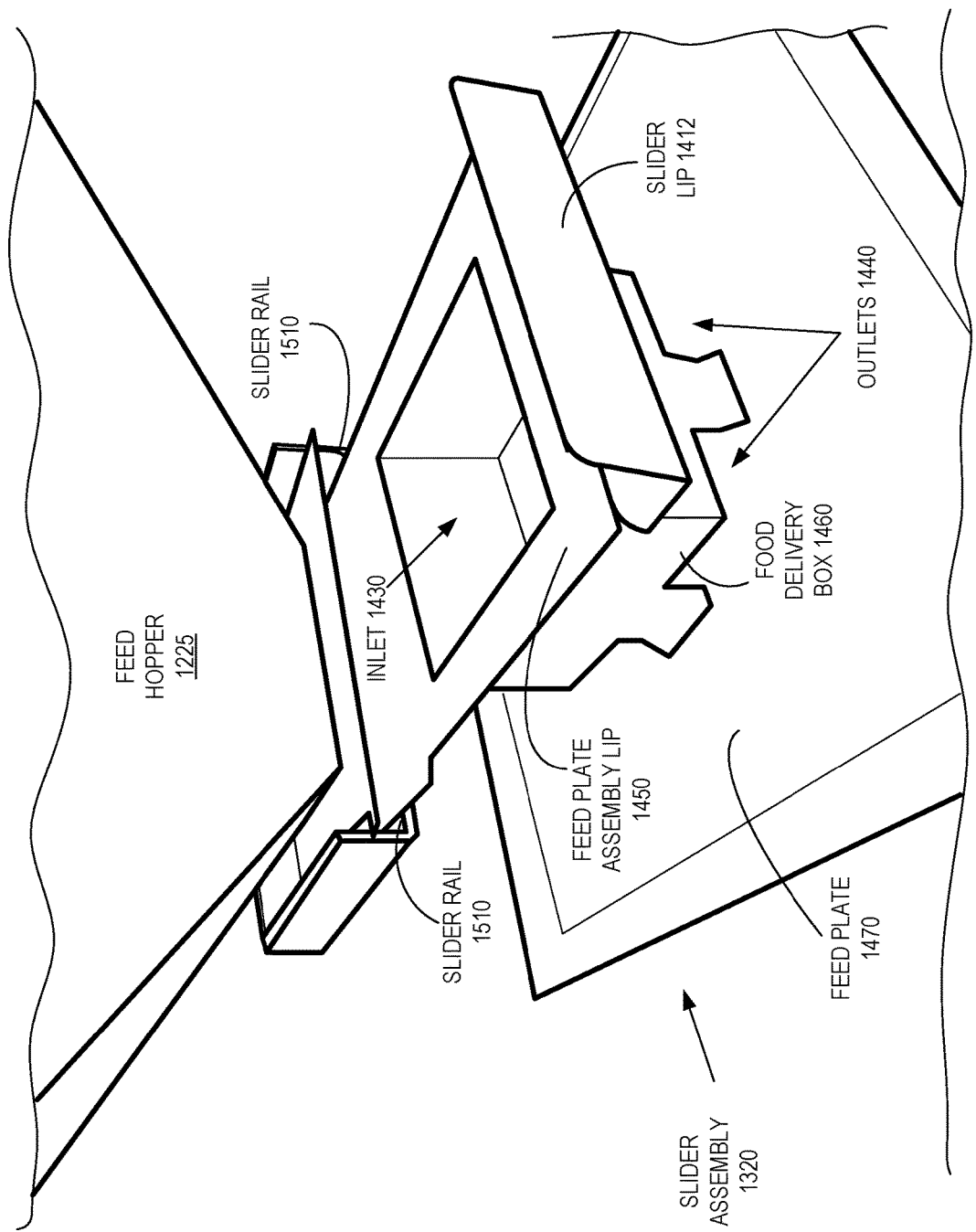
FIG. 15 illustrates a detail view of a wild bird treatment system removable slider assembly in closed position, according to embodiments of the present invention.
Figure 16:
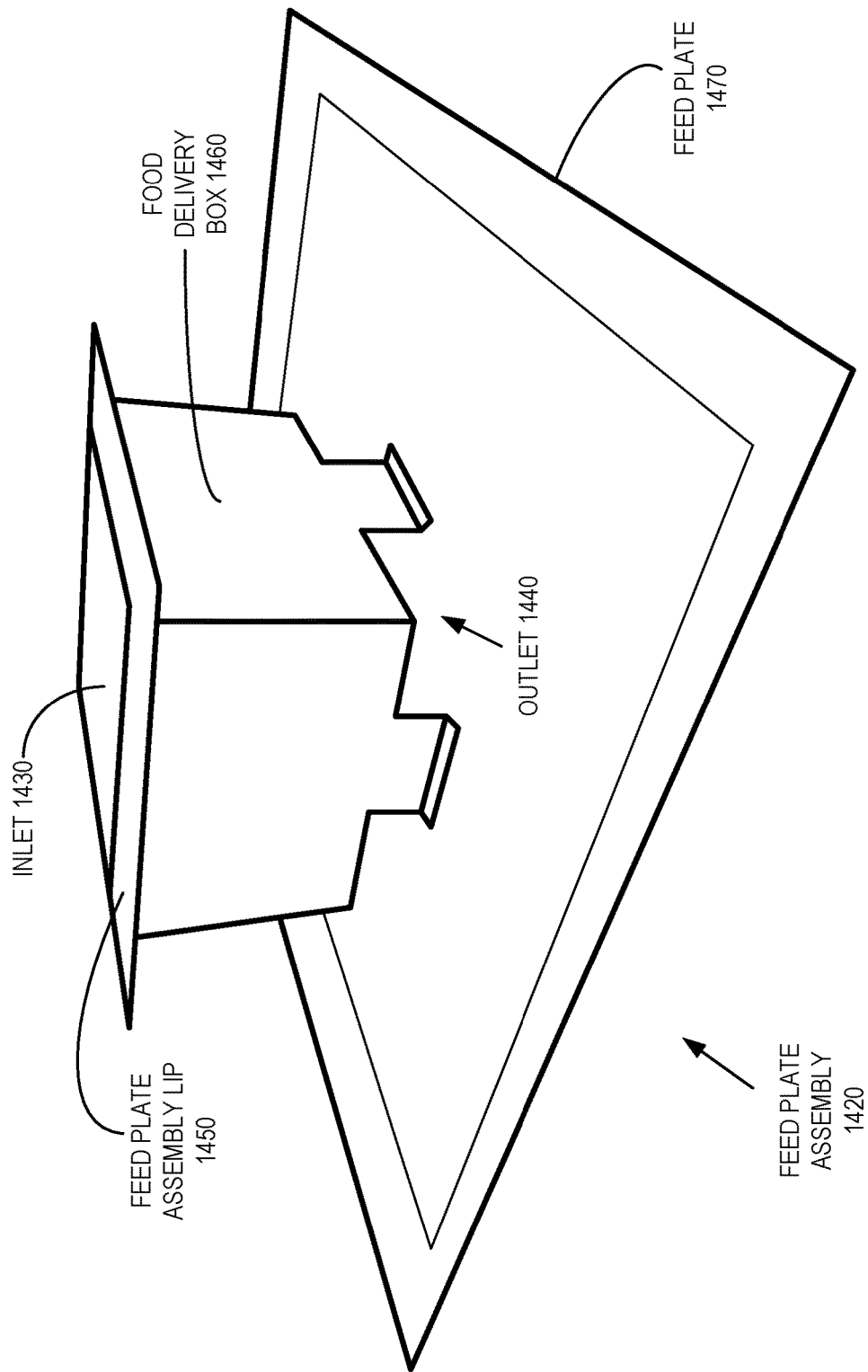
FIG. 16 illustrated a detail view of a wild bird treatment system removable feed plate assembly, according to embodiments of the present invention.

Referring now to FIGS. 14-16, FIGS. 14 and 15 depict details of slider assembly 1320. FIG. 16 depicts details of feed plate assembly 1420. Note that slider assembly 1320 includes feed plate assembly 1420, as described below.

Referring now to FIG. 14 slider assembly 1320 is shown with its feed slide 1410, including a stopper 1411 and slider lip 1412. Referring to FIG. 15, feed slide 1410 slides on two slider rails 1510 affixed to the bottom of feed hopper 1225 for supporting and guiding feed slide 1410. In an embodiment for delivery of drug treatment to wild bobwhite quail, A36 14-gauge sheet steel is a suitable material for forming slider assembly 1320.

Referring to FIG. 16, feed plate assembly 1420 is shown, including food delivery box 1460 with inlet 1430 and outlet 1440. Feed plate assembly 1420 also includes feed plate assembly lip 1450 and feed plate 1470 which is suspended from and affixed to the outlet side of food delivery box 1460. In an embodiment for treating wild bobwhite quail, feed plate 1470 may by 9×9 inches square and food delivery box 1460 3.5 inches wide, 3.5 inches deep, and 2 inches high.

Feed slide 1410 may be manually opened and closed by pulling or pushing on slider lip 1412. With feed slide 1410 in the closed position (shown in FIG. 15), stopper 1411 slips up into the interior perimeter of the outlet of hopper 1470 to shut off the flow of feed. With feed slide 1410 in the open position (shown in FIG. 14), medicated feed 155 in feed hopper 1225 is gravity fed to plate 1470 with outlets 1440 in food delivery box 1460 sized to appropriately control the rated of medicated feed 155 released onto plate 1470 for both a small number of individual targeted wild birds and for large coveys that may be intensely feeding from plate 1470. The correct metering of medicated feed 155 or any feed to a targeted wild bird species may be provided by properly sized outlets 1440. All dimensions are optimized for the feeding of a particular species of wild targeted bird and type of feed. In an embodiment for treating wild bobwhite quail, the size of outlets 1440 is approximately 0.5 inches high and 1 inch wide on each side of the 90 degree angle of food delivery box 1460.

The distance between feed plate 1470 and open bottom side 1140 or optional floor 1210 is specific for the species of targeted wild bird to be treated and represents the height at which the targeted birds have the ability to reach up, peck at, and ingest medicated feed 155. In an embodiment for treating wild bobwhite quail, the distance between feed plate 1470 and open bottom side 1140 or optional floor 1210 is approximately 8 inches. The distribution of medicated feed 155 to feed plate 1470 keeps the medicated feed suspended, off the ground, and available to targeted wild birds, which are able to access system 1100 through appropriately sized entrances 1160, which keep larger non-targeted animals out of system 1100. Non-targeted animals small enough to enter system 1100 (e.g., rats, mice, sparrows) through entrances 1160 are too small to reach feed plate 1470 and reach the medicated feed. Further, the distance between feed plate 1470 and the bottom of feed hopper 1225 prevents wild bobwhite quail from standing on feed plate 1470 to eat, that is, the birds can't fit in the space. This means wild bobwhite quail are unable to scratch around in medicated feed 155 and knock food on the ground, thus preventing waste and preventing access to medicated feed by non-targeted animals small enough to enter the system through entrances 1160. Further, with feed plate 1470 in the center of the 40 square inch system 1100, medicated feed 155 is far enough away from the sides of system 1100 that larger mammals, like pigs, are unable to smell the feed and thus not incentivized to try digging under system 1100.

Slider assembly 1320 is completely removable from feeder assembly 1220 by grasping and pulling on slider lip 1412 until feed slide 1410 clears slider rails 1510. This allows ease of cleaning, although the incorporation of feeder assembly 1220 within the interior of the enclosure 1110 structure keeps system 1100 relatively maintenance-free for treating wild coveying quail in their natural habitat for weeks. Medicated feed 155 or any other feed loaded in feed hoper 1225 is protected from sun, wind, and rain system 1100, with system 100 providing a continual flow of medicated feed to the feed plate 1470.

Figure 17:
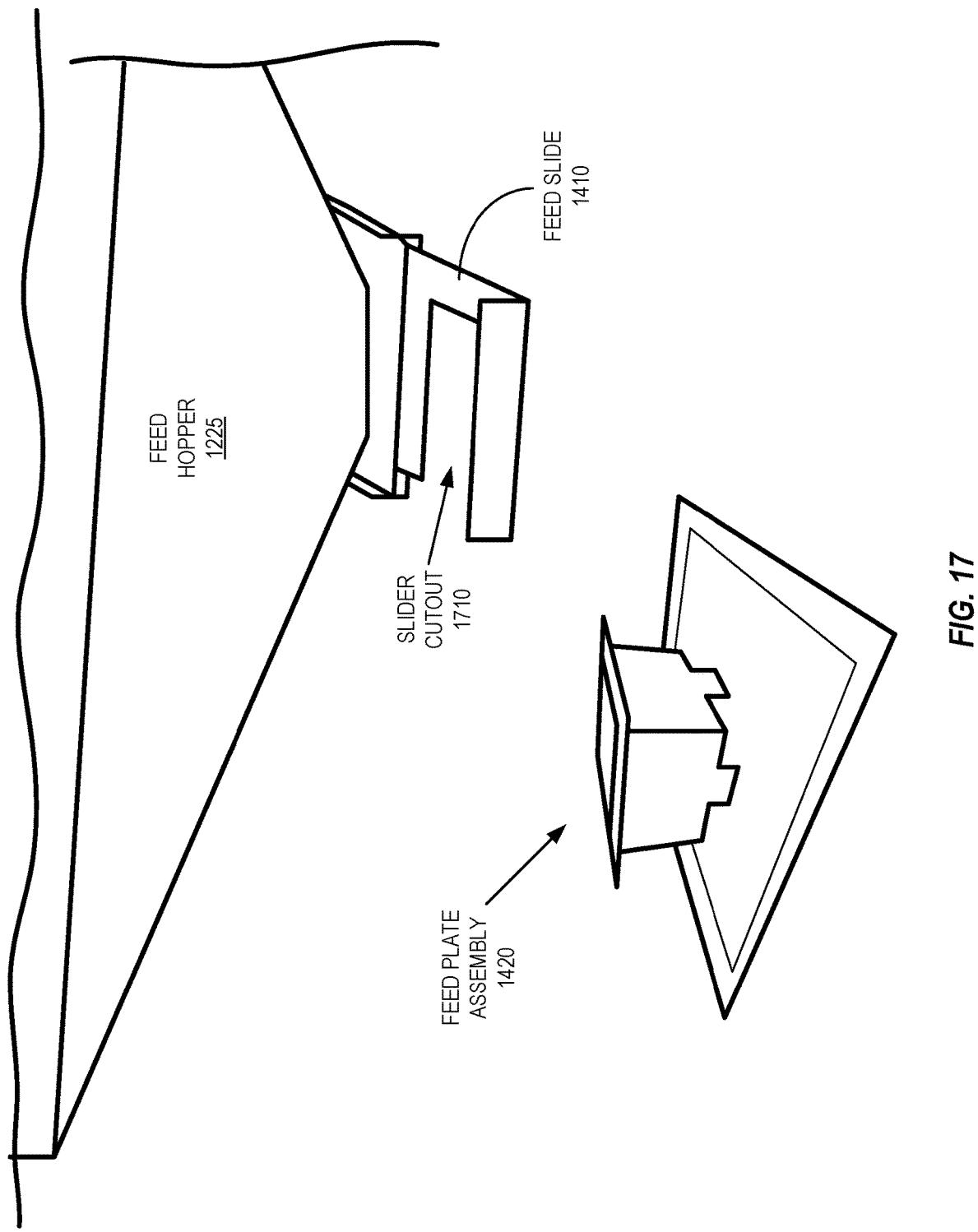
FIG. 17 illustrates a detail view of a wild bird treatment removable feed plate assembly and slider cutout, according to embodiments of the present invention.

Referring now to FIGS. 16 and 17, feed plate assembly 1420 may be entirely removed from slider assembly 1320 and is shown removed in FIG. 16. Feed slide 1410 includes slider cutout 1710 of the same shape as food delivery box 1460 with one open side and slightly larger dimensions. The food delivery box 1460 portion of feed plate assembly 1420 can be slid into the slider cutout 1710 and dropped down, with feed plate assembly lip 1450 resting on the edges of slider cutout 1710, holding feed plate assembly securely in place.

Figure 18:
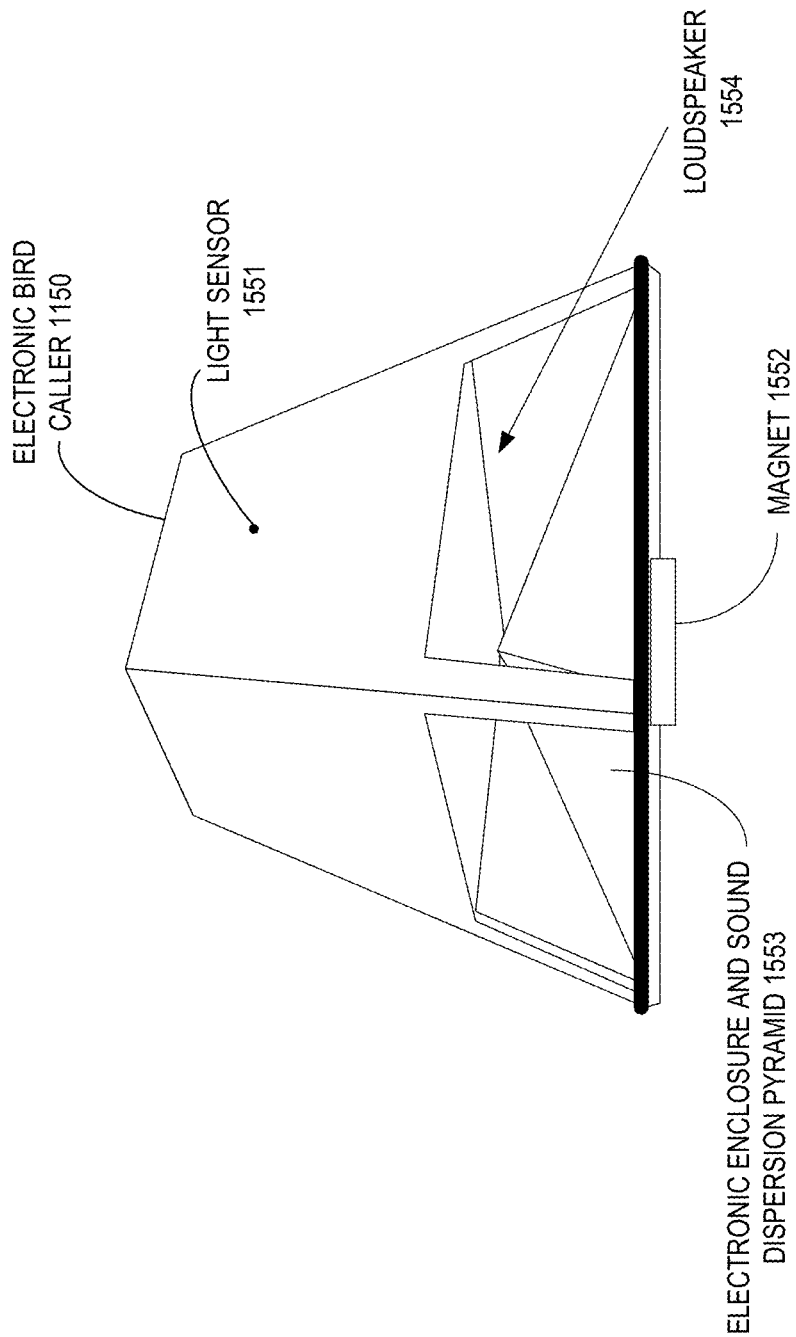
FIG. 18 illustrates a detail view of an electronic bird caller, according to embodiments of the present invention.

Wild bobwhite quail and other wild coveying gamebirds have the ability to co-locate each other with the use of sound, including the vocal calls emitted from an individual or group of wild bobwhite quail. Coveying birds have a social structure that strongly reunites a dispersed covey through covey calls. The quail covey call is a high attractor to bring the covey back together after some dispersion of movement during the day. Referring now to FIG. 18, an electronic bird caller 1150 is depicted for emitting a natural covey call of a species targeted for treatment to attract both individual birds and coveys of the targeted species to system 1100. Electronic bird caller 1150 uses a suitable digital electronic call system that can emit a very realistic wild coveying quail call at about 2-hour intervals during the day from dawn until sunset, as determined using light sensor 1551. Preferably, the electronic call system is programmable and has a database of different bird calls for the targeted species, such as male and female calls for example. Loudspeaker 1554 can project the covey call at approximately 100 decibels, which allows for the covey call vocal signal to be heard at distances from hundreds of yards up to 1 mile. Thus, system 1100 may be deployed on one per square mile basis, as described below in connection with FIGS. 8-10. Electronic enclosure and sound dispersion pyramid 1553 of the electronic bird caller 1150 allows the projection of the electronic covey call signal in a 360° radius of electronic bird caller 1150. In an embodiment for treating wild bobwhite quail, for example, electronic bird caller 1150 includes a suitable and durable battery, for example a lithium thionyl chloride battery manufactured by PKCELL Battery Co LTD, that provides sufficient power for up to approximately 1-2 years, even in the tough weather conditions of West Texas. Loudspeaker 1554 may be a downward facing horn speaker, with sound directed onto sound dispersion pyramid 1553, capable of producing approximately 115 decibels. A36 14-gauge sheet steel with powder coating is a suitable material for forming the enclosure of the electronic bird caller 1150.

Electronic bird caller 1150 may have a base plate with a threaded nut, allowing it to be attached to a magnet 1552 or L bracket. Magnet 1552 is used for mounting to a metal structure, such as, for example, roof 1120 of system 1100. Alternatively, electronic bird caller 1150 may be mounted suitably, such as to an adjacent tree, by an L bracket. In an embodiment for treating wild bobwhite quail, magnet 1552 may be a 115 pound rubber incased neodymium cup magnet.

Field tests along with tens of thousands of camera surveillance data, reveal little, if any, predation of wild bobwhite quail in system 1100. Medicated feed 155 remains protected and targeted to wild bobwhite quail. System 1100 is relatively maintenance-free. In addition, system 1100 has not been penetrated by cattle, feral hogs, raccoons, skunks, coyotes, and hawk predators while wild bobwhite quail are within system 1100. In addition, surveillance of installed systems 1100 on ranches in the Rolling Plains ecoregion of West Texas reveals that wild bobwhite quail utilizing the systems do not become domesticated. They remain wild, capable of surviving predators, and have lower nutritional and environmental stress, which enhances their survival and reproductive capability. The sustainability of wild bobwhite quail in their natural habitat is increased when they have access to medicated feed 155 from systems 1100.

Figure 8:
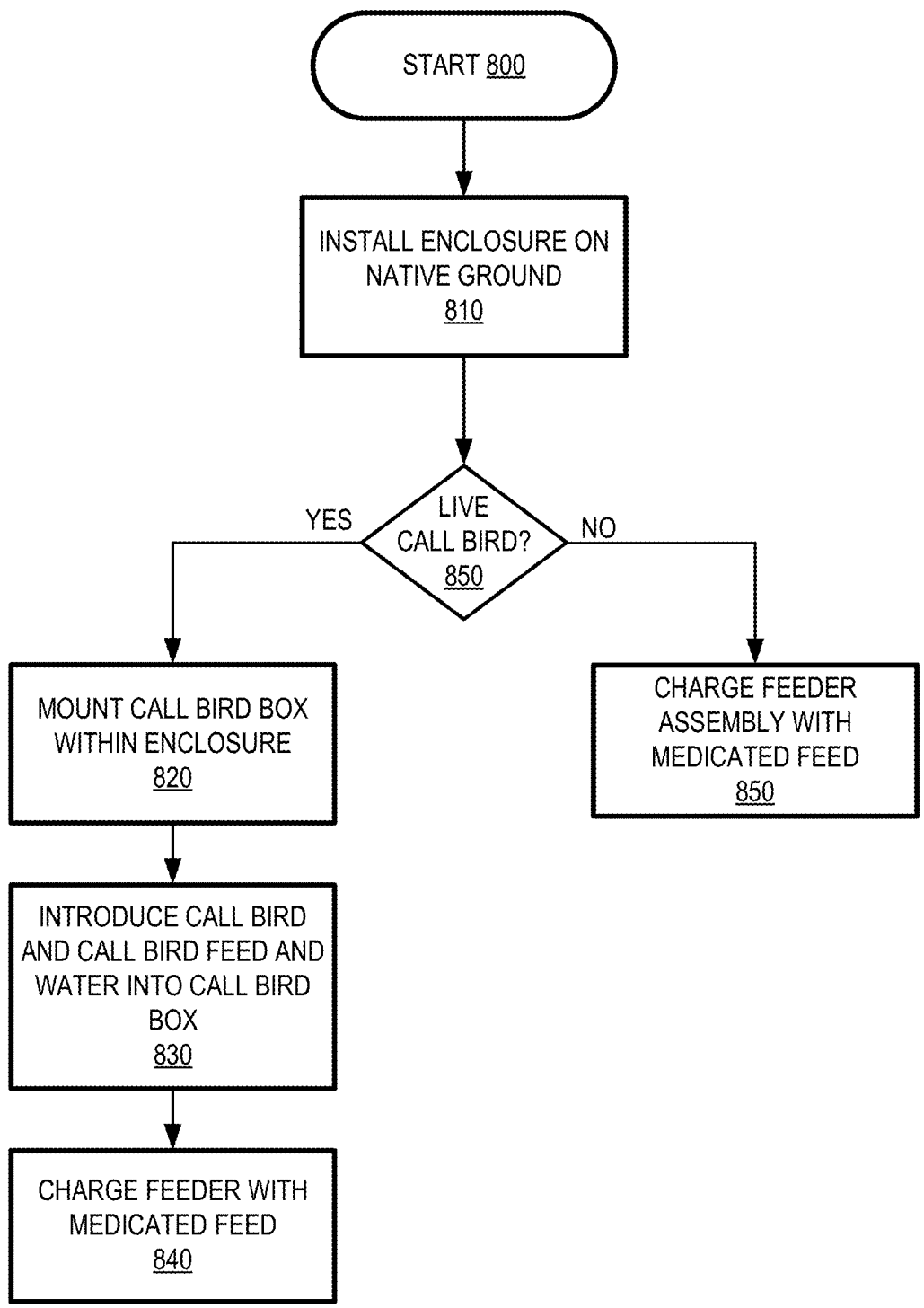
FIG. 8 illustrates a flow chart for a method of installing a wild bird treatment system, according to embodiments of the present invention.

Turning now to FIG. 8, a process flow diagram of an exemplary method of installing a single treatment system 100 or 1100 at a specific site in the wildlife habitat is depicted. Wild bird treatment system installation starts at step 800. In step 810, an enclosure 102 having entrances 160 and door 150 formed therein, or an enclosure 1110 with entrances 1160 formed therein, is initially installed on native ground 175 at a suitable site in the targeted habitat area. The color of enclosure 102 or 1110 is such that it blends into the landscape of the targeted area of the native habitat. For example, a flat green color is suitable for many targeted areas of native habitat in the Rolling Plains ecoregion of West Texas.

Systems 100 and 1100 are preferably installed adjacent to adequate ground habitat to protect the wild, coveying birds from predators and is preferably located to the east of standing vegetation (e.g. salt cedar and mesquite trees), so that shade can be provided for the summer afternoon sun.

At 850, if a live call bird is to be used for attracting wild coveying birds, the method branches to step 820. If a live call bird will not be used for attracting wild coveying birds, the method branches to step 850.

In step 820, in the first embodiment, call bird box 130 is mounted within enclosure 102. The bottom of call bird box 130 may be located approximately five feet from native ground 175 to help the bird calls carry a greater distance. Call bird box 130 may be positioned on the east side of system 100 in order to be shaded from the summer afternoon sun.

In step 830, in the first embodiment, call bird 125 and its feed and water are introduced into call bird box 130. Due to the reproduction cycle of wild coveying birds such as bobwhite quail, the call of the call bird may be made more attractive by changing the gender of the call bird depending on the season of the year. Call bird 125 is preferably a rooster when system 100 is deployed in the winter, spring, or fall. Call bird 125 is preferably a hen when system 100 is deployed in the summer. Rooster feed may be a commercially available feed designed for mature, healthy poultry. Hen feed is preferably a commercially available feed designed for mature egg-laying poultry with the addition of oyster shell crumbles to assist the hen in maintaining adequate calcium levels during the egg laying period. A water-borne antibiotic is preferably administered to call bird 125 by adding it to the call bird's drinking water for the first week when system 100 is put in service.

In step 840, in the first embodiment, feeder 170 is charged with medicated feed 155, however water is not typically provided for the targeted birds. Medicated feed 155 may be a formulated chicken mash diet with integrated treatment drug. For treatment of bobwhite quail, milo may be used to pre-bait system 100 or 1100. Once wild bobwhite quail begin utilizing system 100 or 1100, medicated feed 155 may be integrated with the milo to introduce the birds to the new feed. For example, bobwhite quail may be transferred from a 100% milo diet to a 100% medicated feed 155 diet in about one week. Alternatively, feeder 170 may be charged with unmedicated feed, for example, a formulated quail crumble diet, particularly in areas of marginal habitat or during drought.

In step 850, in the second embodiment, the feeder assembly 1220 is charged with medicated feed 155 or alternatively unmedicated feed. In an embodiment for treating wild bobwhite quail, feeder assembly 1220 may be charged with about 50 pounds medicated feed. Alternatively, feeder assembly 1220 may be charged about 150 pounds unmedicated crumble diet formulated for bobwhite quail, particularly in areas of marginal habitat or during drought.

Figure 9:
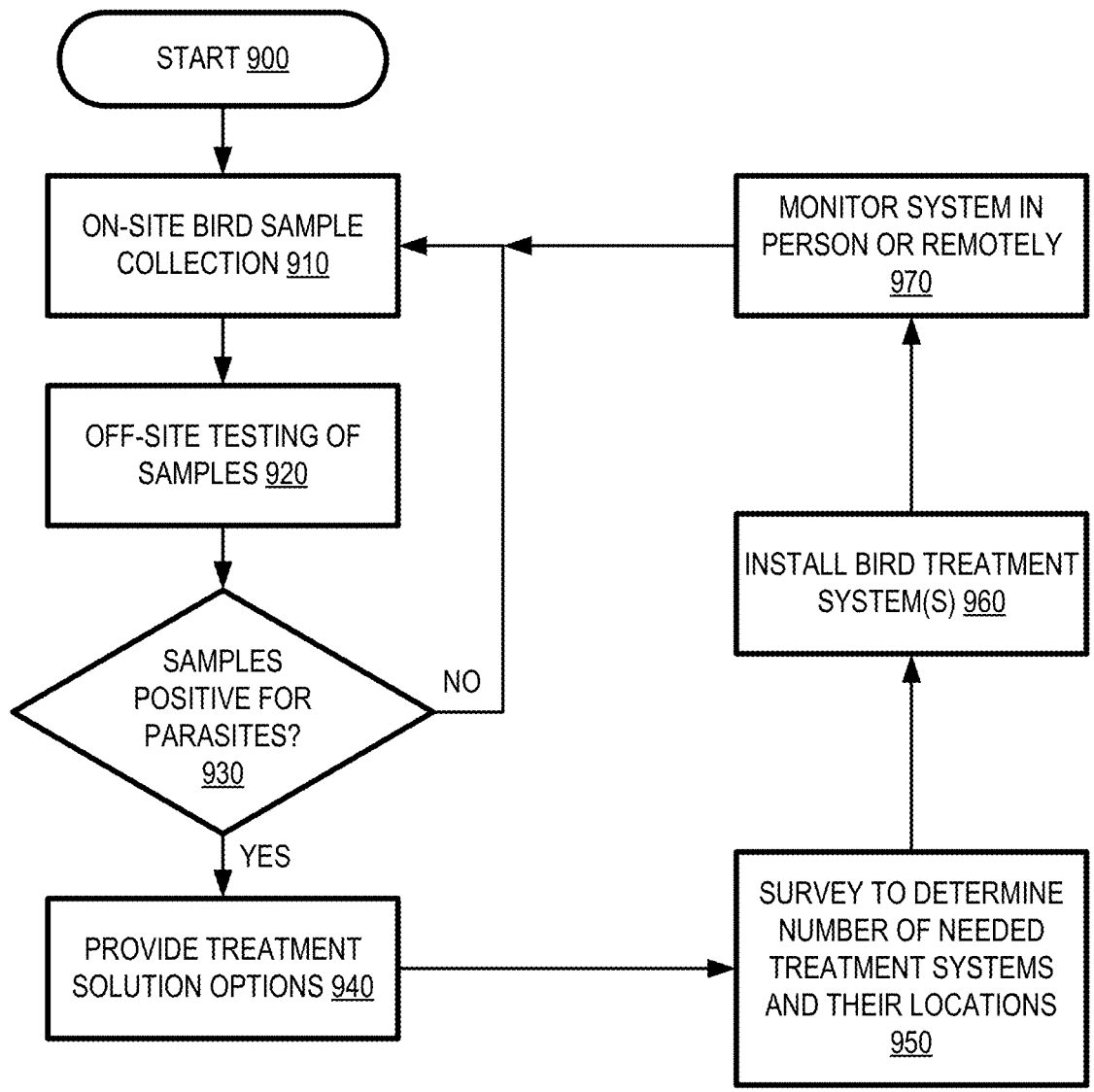
FIG. 9 illustrates a flow chart for a method of treating wild birds, according to embodiments of the present invention.
Figure 10:
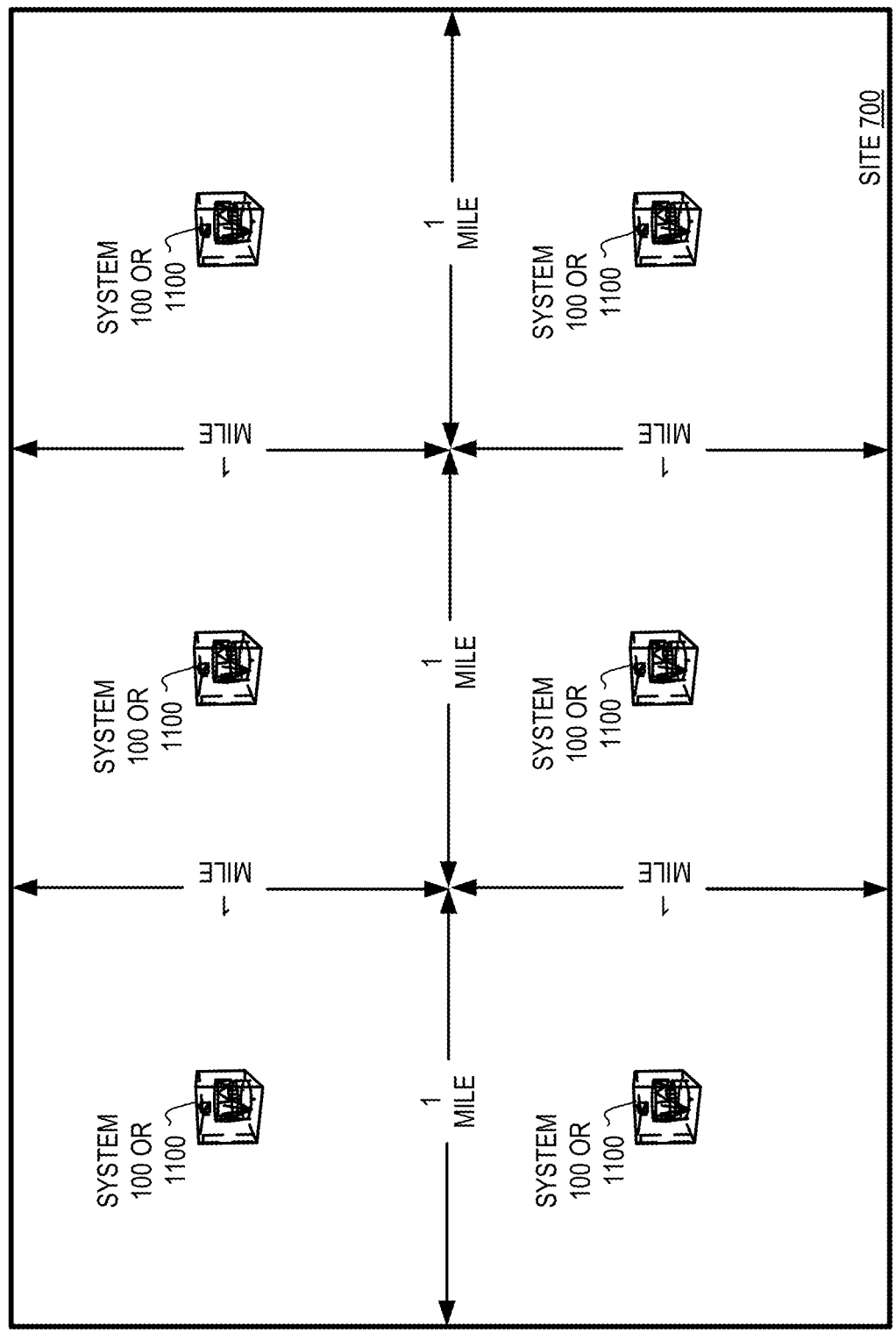
FIG. 10 illustrates an exemplary installation site view of an array of wild bird treatment systems located in a targeted area of the wild bird habitat, according to embodiments of the present invention.

FIG. 9 depicts a process flow diagram of an exemplary method of treating wild birds in a targeted geographical area of the wildlife habitat. FIG. 10 illustrates an installation site plan 700 for installing a plurality of bird treatment systems 100 or 1100 at various sites throughout the targeted area which are suitable for use in carrying out the method depicted in FIG. 9.

Referring now to FIGS. 9 and 10, the wild bird treatment method starts at step 900. At step 910, samples from wild, coveying birds are collected from site 700. At step 920, the collected samples are tested to determine if the targeted wild, coveying birds are infected with parasites or another disease being investigated. At step 930, if testing shows that there are parasites or other diseases, treatment solution options are formulated at step 940. If no parasites or diseases are found in the collected samples, the method returns to step 910, involving sampling of the targeted wild, coveying birds at a later time.

At step 950 the number of needed treatment systems 100 or 1100 and locations on site 700 are determined by conducting a survey of site 700. Factors included in determining how many and where system(s) 100 are placed include the targeted species, terrain topology, prevailing wind directions, and ambient noise level. Generally, one treatment system per section of land (or per square mile) should be adequate. Camera surveillance in the treatment system can provide detailed information on bird use in terms of numbers, time, and frequency of visits, if desired.

As depicted in FIG. 9, for treating wild, coveying birds such as bobwhite quail, wild bird treatment systems 100 or 1100 are preferably installed at a rate of about one system per square mile of habitat in which the treatment of the targeted bird is to be applied in relatively quiet rural areas having relatively level terrain. Treatment systems 100 or 1100 should be located approximately in the center of the section to be treated, so that the call of live call bird 125 will be able to reach out at least one half mile in a 360° radius to attract other wild birds of the same species to systems 100 or 1100. The locations of and placement of such systems may vary in other environments, depending on the terrain, background noise level, and other factors.

At step 960 wild bird treatment system(s) 100 or 1100 are installed. Systems 100 and 1100 are preferably installed adjacent to adequate ground habitat to protect the wild coveying birds from predators and is preferably located to the east of standing vegetation (e.g. salt cedar and mesquite trees), so that shade can be provided for the summer afternoon sun. In an embodiment for treating bobwhite quail, systems 100 or 1100 are preferably deployed in late winter or early spring to facilitate habituation of the wild coveying birds to come to the treatment for feeding so that medicated feed can be delivered easily to the targeted birds at a later time.

Installation 960 in the first embodiment includes introduction of call bird 125 to system 100. Due to the reproduction cycle of wild coveying birds, in an embodiment of the present invention for treating coveying birds such as bobwhite quail, call bird 125 is preferably a rooster when system 100 is deployed in the winter, spring, or fall. Call bird 125 is preferably a hen when system 100 is deployed in the summer of the year. Installation 960 of system 100 also includes providing call bird 125 with food and water. In an embodiment for treating bobwhite quail, preferred feed for roosters and hens is a quail crumble formulation design for mature healthy quail. A water-borne antibiotic is preferably administered to call bird 125 for one week at installation step 960 when system 100 is put in service.

In an embodiment for treating wild coveying birds, installation 960 may include charging feeder 170 of the first embodiment and feeder assembly 1220 of the second embodiment with medicated feed 155 but does not include providing water. Medicated feed 155 may be a formulated mash diet with integrated treatment drug. For treatment of wild coveying birds such as bobwhite quail, milo may be used to pre-bait system 100. Once wild bobwhite quail begin utilizing system 100 or 1100, medicated feed 155 may be integrated with the milo to introduce the birds to the new feed. Bobwhite quail may be transferred from a 100% milo diet to a 100% medicated feed 155 diet in about one week.

At step 970, wild bird treatment system(s) 100 or 1100 are monitored in person or remotely via cameras or other electronic means having the capability to transmit the pictures to a central observation office. For treating wild coveying birds such as bobwhite quail, step 970 includes weekly on-site monitoring and re-stocking of live call bird 125 feed and water if enclosure 100 is utilized.

The method returns to step 910, sampling of wild, coveying birds to determine if the parasites are controlled in the targeted bird species. The sampling of birds after medicated feed treatment can occur promptly after the treatment period (estimated 2 weeks to 1 month) is concluded.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

As used herein, the terms "or" is intended to cover a non-exclusive inclusion. That is, "or" includes both meanings of both "or" and "and/or."

The terminology used herein is for the purpose of describing particular embodiments only and is not intended to be limiting of the invention. As used herein, the singular forms "a", "an" and "the" are intended to include the plural forms as well, unless the context clearly indicates otherwise.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and are not intended to otherwise limit the scope of the present invention in any way. Other variations are within the scope of the following claims. Those skilled in the art having read this disclosure will recognize that changes and modifications may be made to the embodiments without departing from the scope of the present invention.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations.

The flowchart and block diagrams in the drawings illustrate the architecture, functionality, and operation of possible implementations of systems and methods, according to various embodiments of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

What is claimed is:

1. A system for treating wild birds, comprising;
   an enclosure for accommodating a plurality of wild coveying birds targeted for treatment, the enclosure having a roof portion, an open bottom for facing native ground upon installation, and a side portion between the roof portion and the open bottom portion;
   at least one entrance into the enclosure adjacent the open bottom of a size and location to permit the targeted wild coveying birds to freely enter into and exit from the enclosure while excluding non-targeted animals;
   an electronic bird caller configurable to emit a natural covey call of and attract a plurality of the wild coveying birds targeted for treatment; and a feeder assembly, slidably removable from the enclosure, wherein the feeder assembly comprises:
a feed hopper having an inlet and an outlet, wherein the outlet is below the inlet; and
a slider assembly, slidably removable from the feeder assembly, wherein the slider assembly comprises:
a feed slide for controlling flow of medicated feed from the feed hopper outlet; and
a feed plate assembly, slidably removable from the slider assembly, wherein the feed plate assembly comprises:
a feed plate; and
a food delivery box with outlets therein, wherein the size of the feed plate and the size of the outlets are configured to control the rate of medicated feed released from the feed hopper based on the wild coveying birds targeted for treatment.

2. The system of claim 1, wherein the side portion of the enclosure comprises a door.

3. The system of claim 1, wherein the side portion shape comprises 4 isosceles trapezoids, and the roof and open bottom portion shapes comprise a square.

4. The system of claim 1, wherein the enclosure size is approximately 40 inches long by 40 inches wide by 27 inches high.

5. The system of claim 1, wherein the side portion comprises cutouts formed of a metal mesh material.

6. The system of claim 1, wherein the at least one entrance adjacent the open bottom comprises four entrances.

7. The system of claim 1, comprising:
a protective lip portion attached to the edge of the side portion and extending outwardly from the edge of the side portion configured to deter ground predators from digging under the side portion of the enclosure upon installation.

8. The system of claim 1 comprising:
a flexible floor portion formed of a metal mesh material affixed to a flexible metal frame having openings therein sized to prevent ground predators from entering the system upon installation.

9. The system of claim 1, wherein the electronic bird caller is affixed to the roof by a magnet.

10. A method for installing a system for treating wild coveying birds targeted for treatment wherein:
the system has an enclosure for accommodating a plurality of wild coveying birds targeted for treatment, the enclosure having a roof portion, an open bottom, and a side portion between the roof portion and the open bottom,
wherein the side portion of the enclosure has at least one entrance adjacent the open bottom of a size and location to permit the targeted wild coveying birds to freely enter into and exit from the enclosure while excluding non-targeted animals; and
the method comprises:
installing the enclosure having the at least one entrance for the wild coveying birds on native ground at a site in a habitat area of the targeted wild coveying birds such that the open bottom faces the native ground and the at least one entrance into the enclosure is adjacent the native ground;
mounting an electronic bird caller configurable to emit a natural covey call of and attract a plurality of the wild coveying birds targeted for treatment;
installing a feeder assembly within the enclosure, and slidably removable from the enclosure, wherein the feeder assembly comprises:
a feed hopper having an inlet and an outlet, wherein the outlet is below the inlet; and
a slider assembly, slidably removable from the feeder assembly, wherein the slider assembly comprises:
a feed slide for controlling flow of medicated feed from the feed hopper outlet; and
a feed plate assembly, slidably removable from the slider assembly, wherein the feed plate assembly comprises:
a feed plate; and
a food delivery box with outlets therein, wherein the size of the feed plate and the size of the outlets are configured to control the rate of medicated feed released from the feed hopper based on the wild coveying birds targeted for treatment; and
charging the feeder assembly with medicated feed suitable for the targeted wild coveying birds which enter the enclosure in order to treat the targeted wild coveying birds for parasites or disease.

11. A method for treating wild coveying birds, comprising:
collecting at least one sample from at least one wild coveying bird targeted for treatment from a targeted area of a natural habitat having a plurality of targeted wild coveying birds;
testing the at least one collected sample to determine if the at least one targeted wild coveying bird is infected with parasites or another disease;
determining the number of and location of treatment systems to be installed at a plurality of sites in the targeted area that are needed to treat the plurality of targeted wild coveying birds in the targeted area;
installing a plurality of treatment systems at the plurality of sites based upon the determining, wherein each of the treatment systems comprises;
an enclosure for accommodating a plurality of wild coveying birds targeted for treatment, the enclosure having a roof portion, an open bottom for facing native ground upon installation, a side portion between the roof portion and the open bottom, and at least one entrance for the targeted wild coveying birds to freely enter into and exit from the enclosure while excluding non-targeted animals;
an electronic bird caller configurable to emit a natural covey call of and attract a plurality of the wild coveying birds targeted for treatment; and
a feeder assembly, slidably removable from the enclosure, wherein the feeder assembly comprises:
a feed hopper having an inlet and an outlet, wherein the outlet is below the inlet; and
a slider assembly, slidably removable from the feeder assembly, wherein the slider assembly comprises:
a feed slide for controlling flow of medicated feed from the feed hopper outlet; and
a feed plate assembly, slidably removable from the slider assembly, wherein the feed plate assembly comprises:
a feed plate; and
a food delivery box with outlets therein, wherein the size of the feed plate and the size of the outlets are configured to control the rate of medicated feed released from the feed hopper based on the wild coveying birds targeted for treatment; and
charging the medicated feed feeder with medicated feed to treat the targeted wild coveying birds entering the enclosure for parasites or disease.

* * * * *